(12) United States Patent
Sabatelli

(10) Patent No.: US 10,025,472 B2
(45) Date of Patent: Jul. 17, 2018

(54) METHOD AND APPARATUS FOR DISPLAYING DATA REGARDING A DEVICE'S TRAVERSAL THROUGH A REGION

(71) Applicant: Apple Inc., Cupertino, CA (US)

(72) Inventor: Alessandro F. Sabatelli, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 803 days.

(21) Appl. No.: 14/502,605

(22) Filed: Sep. 30, 2014

(65) Prior Publication Data

US 2015/0346971 A1    Dec. 3, 2015

Related U.S. Application Data

(60) Provisional application No. 62/006,234, filed on Jun. 1, 2014, provisional application No. 62/006,243, filed on Jun. 1, 2014.

(51) Int. Cl.
*G06F 3/048* (2013.01)
*G06F 3/0484* (2013.01)
(Continued)

(52) U.S. Cl.
CPC ......... *G06F 3/04842* (2013.01); *G01C 21/20* (2013.01); *G09G 5/363* (2013.01); *G09G 5/37* (2013.01); *G09G 5/377* (2013.01); *G06F 3/04845* (2013.01); *G06F 3/04847* (2013.01); *G09G 2320/08* (2013.01); *G09G 2320/103* (2013.01); *G09G 2354/00* (2013.01); *G09G 2370/22* (2013.01); *G09G 2380/00* (2013.01)

(58) Field of Classification Search
CPC ............ G06F 3/04842; G06F 3/04845; G06F 3/04847; G09G 5/37; G09G 5/377; G09G 5/363

See application file for complete search history.

(56) References Cited

U.S. PATENT DOCUMENTS 6,539,639 B2    4/2003    Smith
7,013,216 B2    3/2006    Walters et al.
(Continued)

OTHER PUBLICATIONS

Garmin, "eTrex Personal Navigator Owner's" Manual,http://www.leb.esalq.usp.br/disciplinas/Topo/leb450/Angulo/eTrex_OwnersManual.pdf, Feb. 2003, 14 pages.
(Continued)

*Primary Examiner* — William Bashore
*Assistant Examiner* — Gregory A Distefano
(74) *Attorney, Agent, or Firm* — Morgan, Lewis & Bockius LLP

(57) ABSTRACT

Some embodiments provide a device that employs novel processes for displaying data regarding its movement in a region. For instance, in some embodiments, the device captures and stores location data at a plurality of locations traversed along the route. Upon receiving a request to view the traversed locations along the route, the device displays a representation of at least a subset of locations along the route based on the stored location data. Upon receiving an identification of a particular location in the displayed representation of the subset of locations, the device displays information regarding the particular location.

51 Claims, 23 Drawing Sheets

(51) Int. Cl.
*G09G 5/37* (2006.01)
*G09G 5/377* (2006.01)
*G09G 5/36* (2006.01)
*G01C 21/20* (2006.01)

(56) References Cited

U.S. PATENT DOCUMENTS

| | | | |
|---|---|---|---|
| 7,907,838 B2 | 3/2011 | Nasiri et al. | |
| 8,526,677 B1 | 9/2013 | Crichton et al. | |
| 8,532,670 B2* | 9/2013 | Kim | G01S 19/16 455/26.1 |
| 2004/0167714 A1* | 8/2004 | Macphail | G01S 19/49 701/469 |
| 2005/0038595 A1 | 2/2005 | Yokota et al. | |
| 2007/0118520 A1* | 5/2007 | Bliss | G01C 21/367 |
| 2011/0252057 A1* | 10/2011 | Huang | G06F 17/30554 707/770 |
| 2012/0116550 A1* | 5/2012 | Hoffman | A63B 24/0084 700/91 |
| 2013/0096819 A1 | 4/2013 | Tarnok | |
| 2014/0009499 A1 | 1/2014 | Gardenfors et al. | |
| 2014/0026088 A1* | 1/2014 | Monte | G01C 21/3682 715/765 |
| 2014/0039840 A1* | 2/2014 | Yuen | A61B 5/6838 702/189 |
| 2015/0330805 A1* | 11/2015 | Cho | H04W 4/02 701/428 |

OTHER PUBLICATIONS

Garmin, "eTrex Owner's Manual", https://www.lowergear.com/prodpics/230eTrex_10_manual_for_rentals.pdf, Jul. 2011, 6 pages.
Office Action, dated Jul. 21, 2016, received in U.S. Appl. No. 14/502,612, 39 pages.
Final Office Action, dated Feb. 6, 2017, received in U.S. Appl. No. 14/502,612, 49 pages.
Office Action, dated Aug. 7, 2017, received in in U.S. Appl. No. 14/502,612, 54 pages.
Final Office Action, dated Jan. 25, 2018, received in U.S. Appl. No. 14/502,612, 67 pages.

* cited by examiner

METHOD AND APPARATUS FOR DISPLAYING DATA REGARDING A DEVICE'S TRAVERSAL THROUGH A REGION

BACKGROUND

In recent years, there has been a dramatic increase in the sale of smartphones and tablets. One reason for this increase is because of the robust computational resources of these mobile devices. With these devices, users can perform a variety of actions that help facilitate many of their daily tasks. For instance, these devices are often used on a daily basis to exchange emails and text messages, participate in calls and video conferences, browse the Internet, prepare documents, play games, etc. However, despite the dramatic increase in their use, the potential of these devices has yet to be reached. These devices have immense computational power and often accompany their users through their daily activities. Ideally, new novel uses for these devices should be found to make them even more useful to their users.

BRIEF SUMMARY

Some embodiments provide a device that employs novel processes for displaying data regarding its movement in a region. For instance, in some embodiments, the device displays concurrently two independent indicators of its movement in a user interface (UI) that it displays on a display screen (e.g., on its display screen). One indicator is a displayed route representation that illustrates the device's past translational movement within the region. The other indicator is a displayed orientation representation that illustrates the device's current orientation at a current location of the device within the region. When the device can move rotationally, the current-orientation representation (also called the orientation indicator) illustrates the device's rotational movement at the current location of the device. In some embodiments, the orientation indicator is, or is part of, a current-location identifier that is placed at an end of the route representation to identify the current location of the device within the region. The current-location identifier in some of these embodiments is a compass, with the orientation indicator being the needle of this compass.

The device independently updates the displayed translation-movement representation and the displayed orientation indicator. For instance, in some embodiments, the device updates the route representation based on its translational movement within the region, while updating the orientation indicator based on its rotation at the current location. Accordingly, when the device changes its orientation without moving translationally, the device updates the displayed orientation indicator but does not update the route representation. Alternatively, when the device moves translationally without changing its orientation, the device updates the displayed route representation but not the displayed orientation indicator.

In some embodiments, the device updates the displayed orientation indicator by using one or more of its sensors (e.g., a magnetometer) to identify its current orientation with respect to the earth's magnetic field (e.g., with respect to the magnetic north) or with respect to true north. On the other hand, to update the translation-movement representation, the device in some embodiments computes its incremental translation movements based on its successive locations in the region. In some embodiments, the device identifies some or all of its successive locations by using one or more location services (e.g., a global positioning system (GPS) service, a WiFi location service, cellular location service, etc.) that it possesses.

In some embodiments, the device derives at least some of the successive locations based on interpolation or extrapolation computations that use location data that was captured through the location services of the device, to interpolate or extrapolate other location data. To improve their accuracy, these computations in some embodiments use data from one or more of the device's motion sensors (e.g., accelerometer). Using computations to derive some of the location data improves the device's power consumption because high frequency use of the device's location services can drain the device's battery.

The orientation indicator specifies how the current orientation of the device relates to the device's previously traveled route (i.e., to the device's previous translational movement). As such, the orientation indicator in some embodiments can assist in the backward traversal of the traveled route. For instance, in some embodiments, the device provides a backtracking mode during which the orientation indicator can be aligned with the route representation by rotating the device, in order to facilitate the device's backward traversal along the traveled route.

During the backtracking mode, the device of some embodiments provides additional indicators to assist a user in the aligning the orientation indicator with the route representation. These additional indicators can be indicative of the degree of alignment or misalignment, and can be different in different embodiments. Examples of such indicators include (1) visual indicators, (e.g., graphical and/or color indicators), (2) sound indicators, (3) haptic indicators, etc.

The route representation in some embodiments includes a plurality of location identifiers to identify some or all of the locations along a route traversed by the device. In some embodiments, the density of the displayed location identifiers is indicative of the speed of the device's traversal along the corresponding locations. Also, in some embodiments, the appearance of the displayed location identifiers is indicative of the duration of the device's stay at the corresponding locations. For instance, the locations at which the device stayed longer are shown as bigger, with different colors, or with different shapes than the locations at which the device stayed a shorter amount of time.

The device in some embodiments presents some or all of the displayed location identifiers on the route representation as selectable items in its user interface (UI). These location identifiers are shown as selectable items in the UI so that a user can select them to see data regarding their corresponding locations. In some embodiments, only a subset of the location identifiers are selectable, and the device displays the location identifiers that are selectable differently than the location identifiers that are not selectable, in order to highlight the identifiers that have associated location data for display over the identifiers that do not have such data.

In some embodiments, the device presents as selectable only the localities at which the device (1) stayed for a certain threshold amount of time, (2) recorded a threshold amount of location sample data, and/or (3) recorded a threshold amount of non-location data, etc. When a locality is defined in terms of its location data and the temporal duration of time during which the device was at the locality, the locality is referred to below as a temporal locality (or temporal sub-region) as it is defined by both its location and time values. When a locality is defined in terms of its location data and the amount of data that the device recorded at the locality, the locality is referred to below as a high data locality (or high data sub-region) as it is defined by both its location and recorded data values.

Different embodiments display different data for a selected locality. For instance, for a particular locality, the device in some embodiments displays (1) location data, such as longitude, latitude, and altitude of the particular locality, and (2) temporal data, such as the time at which the device was at that particular locality. Also, when presenting the location and temporal data for a locality, the device in some embodiments provides a backtracking option that when selected, initiates the device's backtracking mode. As mentioned above, the backtracking mode guides the device back to the corresponding location of the selected identifier, by providing one or more feedback indicators to maintain the alignment of the orientation indicator with the route representation as the device traverses backwards along the route.

For a selectable locality, the device in some embodiments displays other types of data in addition to or instead of the location and temporal data. Such other types of data include non-location data that the device recorded while being at the locality. For the selectable localities, the device in some embodiments displays different types of recorded non-location data (also called captured non-location data below). Examples of the recorded non-location data types that are available in some embodiments include (1) images captured by the device at the localities, (2) communications (e.g., electronic mails, text messages, voicemails, phone calls, etc.) sent, received, and/or reviewed by the device at the localities, (3) songs and videos played at the localities, etc.

To present recorded non-location data for the localities, the device in some embodiments records and stores information about the non-location data based on temporal and location data that the device records with the non-location data. The temporal and location data allow the device to display the recorded non-location data for a particular locality. For instance, in some embodiments, the temporal and location data allow the device to store, retrieve, and display the recorded non-location data based on three-dimensional values (e.g., latitude, longitude, and time), or based on four-dimensional values (e.g., latitude, longitude, altitude and time).

In different embodiments, the device implements the storage and retrieval of the captured non-location data differently. In some embodiments, the device stores the captured non-location data in one or more data stores (e.g., databases) with metadata that identifies the location and time of the data capture, and then later retrieves the captured non-location data from the data stores (e.g., by querying the databases) based on location and/or temporal search criteria.

Between the storage and retrieval operations, the device of some embodiments performs indexing operations to optimize the retrieval of the captured non-location data based on location and time search criteria. For instance, in some embodiments, the device (1) creates a separate data store (e.g., a database) for the localities, (2) for each locality, creates a storage structure (e.g., a table or a record), (3) identifies each locality and its storage structure in the data store based on an index value, (4) in each locality's storage structure, has references (e.g., pointers) to the non-location data that the device recorded for that locality, and (5) subsequently uses the references to retrieve the recorded non-location data when it needs to display such data for a locality. Alternatively, in the data stores that store the recorded, non-location data, the device of other embodiments tags the stored, captured non-location data with indices that are associated with the localities. These indices can then later be used to retrieve the captured non-location data for a particular locality based on that locality's index value.

One of ordinary skill in the art will realize that the device of some embodiments does not employ all of the novel data capture and display features that were described above. For instance, some embodiments may use only the route and locality review features without using the backtracking modality. Alternatively, the device in other embodiments might use all three of these features, but it might not capture and display non-location data (such as captured photos, reviewed communications, played media, etc.) for the selectable localities.

In still other embodiments, the device presents captured non-location data for localities without providing the route review feature or backtracking modality. Specifically, as mentioned above, the selectable localities in some embodiments are displayed as sub-regions along the device's route that the device identifies based on one or more criteria, such as the duration of the device's stay at the locality, the amount of non-location data recorded at the locality, the amount of location data captured at the locality, etc. In some embodiments, the device displays selectable representations of the localities, and upon selection of one of them, displays at least a subset of the non-location data captured by the device (e.g., display captured photos, display titles of played songs or videos) at the selected locality. The device in some of these embodiments displays the selectable localities along a representation of a route taken by the device. However, in other embodiments, the device displays the selectable localities without any route representation (e.g., as unconnected locations on a map of a region that the device has traversed once or several times). In yet other embodiments, the device allows the selectable localities to be viewed independently or interconnected based on user's request or preferences.

The preceding Summary is intended to serve as a brief introduction to some embodiments of the invention. It is not meant to be an introduction or overview of all-inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF DRAWINGS

The novel features of the invention are set forth in the appended claims. However, for purposes of explanation, several embodiments of the invention are set forth in the following figures.

DETAILED DESCRIPTION

Figure 1:
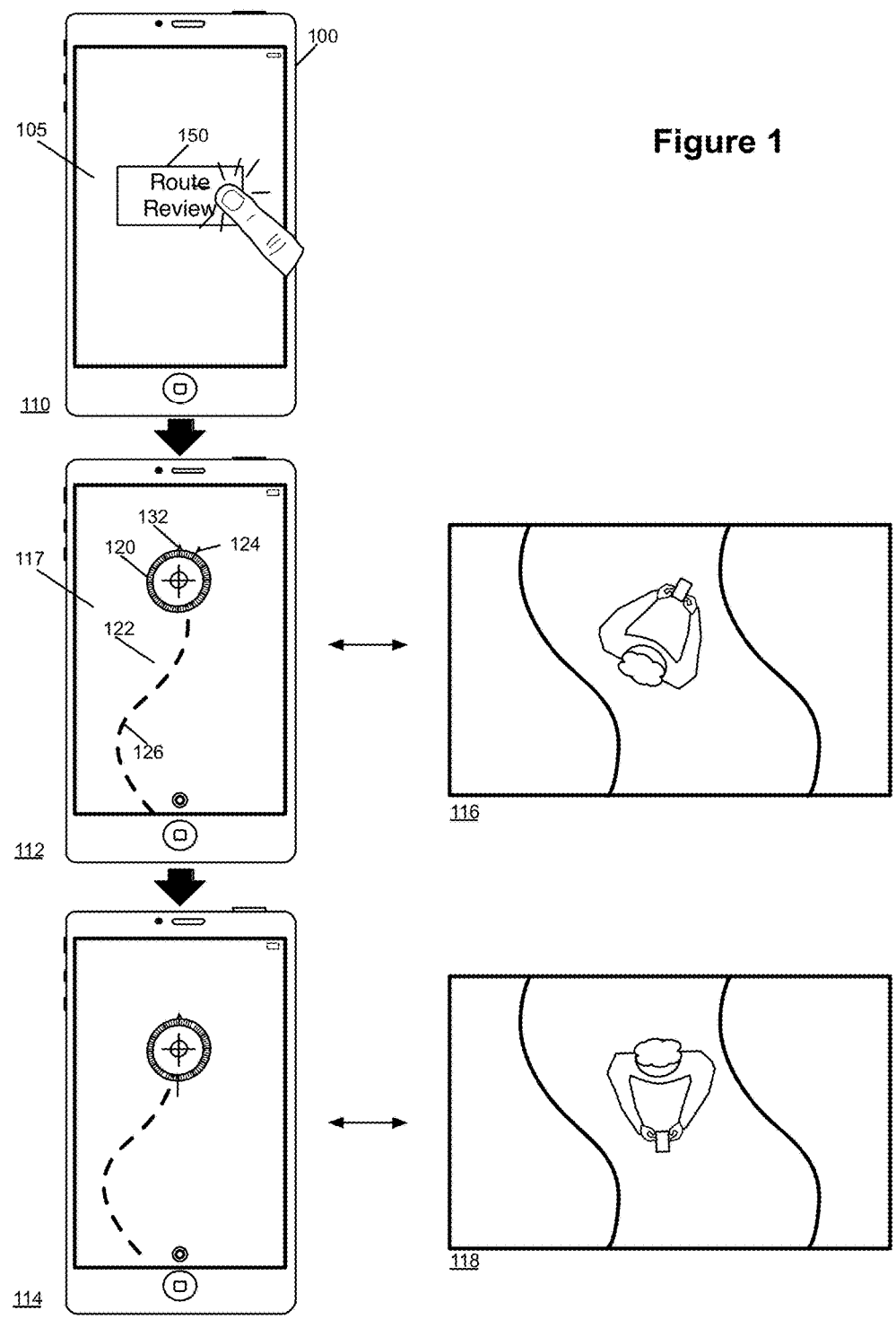
FIG. 1 illustrates an example of a device that displays its movement in a region by displaying representations of the route that it has taken and its current orientation.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a device that employs novel processes for capturing and displaying data regarding its movement in a region. For instance, in some embodiments, the device concurrently and independently displays two indicators of its movement in a user interface (UI) that it displays on a display screen (e.g., on its display screen). One indicator is a displayed route representation that illustrates the device's past translational movement within the region. The other indicator is a displayed orientation representation that illustrates the device's current orientation at a current location of the device within the region.

The device independently updates the displayed translation-movement representation and the displayed orientation indicator. For instance, in some embodiments, the device updates the displayed orientation indicator based on the output of one or more of its sensors (e.g., of its magnetometer), which detect the device's current orientation with respect to the earth's magnetic field (e.g., with respect to the magnetic north) or with respect to true north. On the other hand, to update the translation-movement representation, the device in some embodiments computes incremental translation movements based on its successive locations in the region. Examples of such computations will be further described below.

In some embodiments, the device has a backtracking mode during which a user can align an orientation indicator with the route representation by rotating the device, in order to travel backwards along a traveled route. During the backtracking mode, the device of some embodiments provides additional indicators to assist a user in the aligning the orientation indicator with the route representation. Examples of such indicators include (1) visual indicators, (e.g., graphical and/or color indicators), (2) sound indicators, (3) haptic indicators, etc.

The route representation in some embodiments includes a plurality of location identifiers to identify some or all of the locations along a route traversed by the device. In some embodiments, the density of the displayed location identifiers is indicative of the speed of the device's traversal along the corresponding locations. Also, in some embodiments, the appearance of a displayed location identifier is indicative of the duration of the device's stay at the corresponding location. For instance, the locations at which the device stayed longer are shown as bigger, with different colors, or with different shapes than the locations at which the device stayed a shorter amount of time.

In some embodiments, some or all of the displayed location identifiers are selectable items in the device's UI. Once a location identifier is selected, the device displays data regarding the selected identifier's corresponding locations. Different embodiments display different data for a selected location. Examples of such data include location data, such as longitude, latitude, altitude of the particular location, as well as temporal data, such as the time at which the device was at that particular location.

Other examples of such data include non-location data that the device recorded while being at the localities. Examples of the recorded non-location data types that are available in some embodiments include (1) images captured by the device at the localities, (2) communications (e.g., electronic mails, text messages, voicemails, phone calls, etc.) sent, received, and/or reviewed by the device at the localities, (3) songs and videos played at the localities, etc. The device in some of these embodiments displays the localities along a representation of a route taken by the device, while in other embodiments the device displays the localities without any route representation (e.g., as unconnected locations on a map of a region that the device has traversed once or several times). In yet other embodiments, the device allows the localities to be viewed independently or interconnected based on user's request or preferences.

Several more detailed embodiments are described below. In many of these embodiments, the device displays representations of prior routes, provides a backtracking mode for traveling back along the prior routes, captures non-location data at different localities, and selectably displays location and non-location data for the different localities. However, one of ordinary skill in the art will realize that the device of some embodiments does not employ all of these novel data capture and display features. For instance, some embodiments may use only the route and locality review features without using the backtracking modality. Alternatively, the device in other embodiments might use all three of these features, but it might not capture and display non-location data (such as captured photos, reviewed communications, played media, etc.) for the localities. In still other embodiments, the device presents captured non-location data for localities without providing the route review feature or backtracking modality.

FIG. 1 illustrates an example of a device 100 that displays its movement in a region by concurrently and independently displaying a representation of the route that it has taken in the region and an indication of its current orientation. The device displays the route representation and the orientation indication in a user interface (UI) 105 that it displays on its display screen. This example is illustrated in terms of three operational stages 110, 112 and 114 of the UI 105, and two top-down views 116 and 118 of the device in the region that correspond to the positions and orientations of the device during the second and third operational stages 112 and 114.

Figure 2:
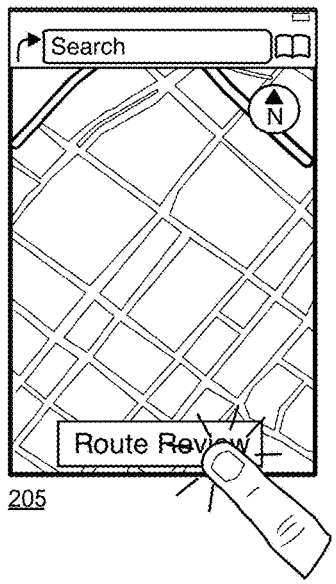
FIG. 2 illustrates examples of different applications or services that can include a route review affordance.
Figure 2:
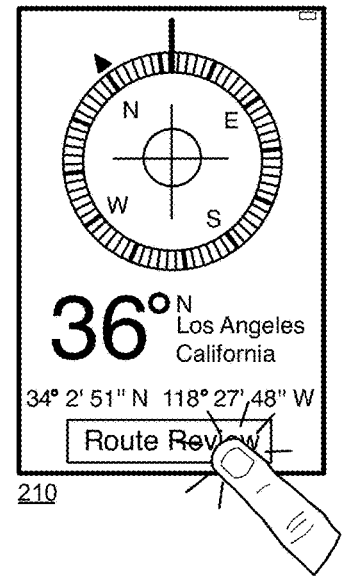
Figure 2:
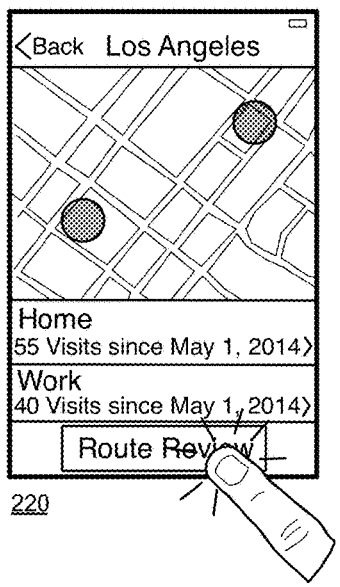
Figure 2:
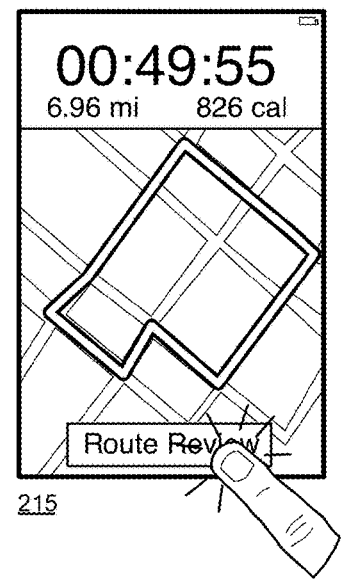

In some embodiments, the device 100 is a mobile device such as a smartphone or tablet. As shown in the first stage 110, the UI 105 of the device has a route review control 150. This control 150 can be an affordance of an operating system of the device or of an application that is executed on the device. FIG. 2 illustrates four examples of different applications or services that can include this affordance. As shown, the route review control is an affordance of a map application 205 in some embodiments, a compass application 210 in other embodiments, a running application 215 in still other embodiments, and a location service 220 of the device's operating system in yet other embodiments.

As shown in FIG. 1, selection of the route review control 150 in the first stage 110, causes the device to provide a route presentation 117 that illustrates the route that the device has taken in the region. As shown in the second stage, the device displays the route in terms of two components: (1) a displayed route representation 122 that represents the device's past translational movement within the region, and (2) a current location identifier 120 that is a compass with a needle 124 that identifies the current orientation of the device at the current location of the device.

As shown, the route representation 122 is formed by several discrete location identifiers 126 that identify some or all of the locations along a route traversed by the device. In some embodiments, the device identifies some or all of its successive location identifiers 126 by using one or more location services (e.g., a global positioning system (GPS) service, a WiFi location service, cellular location service, etc.) that it possesses. In some embodiments, the device derives at least some of the locations that are represented by identifiers 126 based on interpolation or extrapolation computations that use sample location data captured through the location services of the device. To improve the accuracy of the derived locations, these computations in some embodiments use data from one or more of the device's motion sensors (e.g., accelerometer). Using computations to derive some of the location data improves the device's power consumption because high frequency use of the device's location services can drain the device's battery.

In some embodiments, the density of the displayed location identifiers is indicative of the speed of the device's traversal along the corresponding locations. For example, some embodiments represent the device's slower speed of travel in a sub-region with a higher density of the location identifiers in that sub-region. This is partly because the device captures more location samples in such a sub-region as it spends a longer duration of time in that sub-region. Also, in some embodiments, the appearances of the displayed location identifiers are indicative of the duration of the device's stay at the corresponding locations. For instance, the locations at which the device stayed longer are shown as bigger, with different colors, or with different shapes than the locations at which the device stayed a shorter amount of time, as further described below. Also, as further described below, some or all of the displayed location identifiers are selectable items in the device's UI, which upon their selection, provide information about their corresponding locations.

Different embodiments use different backdrops for the route representation 122. In some embodiments, the route representation 122 appears over a single-color backdrop (e.g., over a white, grey, or black backdrop). In other embodiments, this representation appears over a roadway map or topological map of the region traversed by the device. Still other embodiments initially present the route representation over a single-color backdrop, and then present it over the roadway or topological map once the map data becomes available. Yet other embodiments controllably present the route representation over one or more types of maps based on a user's request or preferences.

As shown in FIG. 1, the compass 120 identifies the current location of the device. The compass has a north arrow 132 that (1) can identify the true north or the magnetic north at the current location of the device, or (2) can indicate a north-up view of the route representation in which the top of the displayed presentation is aligned with the true north or magnetic north direction. In FIG. 1, the north arrow 132 points straight up to indicate that the current presentation is a north-up presentation. In some embodiments, the device has one or more sensors (e.g., magnetometer, gyroscopes, accelerometers, etc.) that identify the true north or the magnetic north direction and the orientation of the device with respect to this direction.

As mentioned above, the compass also has a current-orientation needle 124 that (1) can identify the current orientation of the device at the current location of the device, or (2) can identify the current orientation of the device in a north-up presentation of the route. In FIG. 1, the second stage 112 shows the current orientation of the device as being about 80°, as it is about 10° to the east of the north direction identified by the north arrow 132. The second and third stages 112 and 114 also illustrate that the current-orientation needle 124 rotates about the compass as the device rotates. Specifically, as shown in top-down views 116 and 118, the device rotates from a 80° orientation to a −90° orientation, and in response, the needle 124 rotates from a 80° position on the compass to a −90° position on the compass.

The angular offset between the orientation needle 124 and the end of the route representation 122 is a pictorial expression of the relation between the current orientation of the device and the previous route traversed by the device. As such, the orientation needle can be used to assist in the device's backward traversal of the traveled route. For instance, as further described below, the device in some embodiments provides a backtracking mode during which the orientation needle can be aligned with the route representation by rotating the device, in order to facilitate the device's backward traversal along the traveled route. During the backtracking mode, the device of some embodiments provides additional indicators to assist a user in the aligning the orientation needle with the route representation. These additional indicators can be indicative of the degree of alignment or misalignment, and can be different in different embodiments. Examples of such indicators include (1) visual indicators, (e.g., graphical and/or color indicators), (2) sound indicators, (3) haptic indicators, etc. The backtracking mode of some embodiments will be further described below.

The device 100 independently updates the displayed translation-movement representation 122 and the displayed orientation needle 124. For instance, when the device changes its orientation without moving translationally, the device updates the displayed orientation indicator, but does not update the route representation. Alternatively, when the device moves translationally without changing its orientation, the device updates the displayed route representation but not the displayed orientation indicator.

Figure 3:
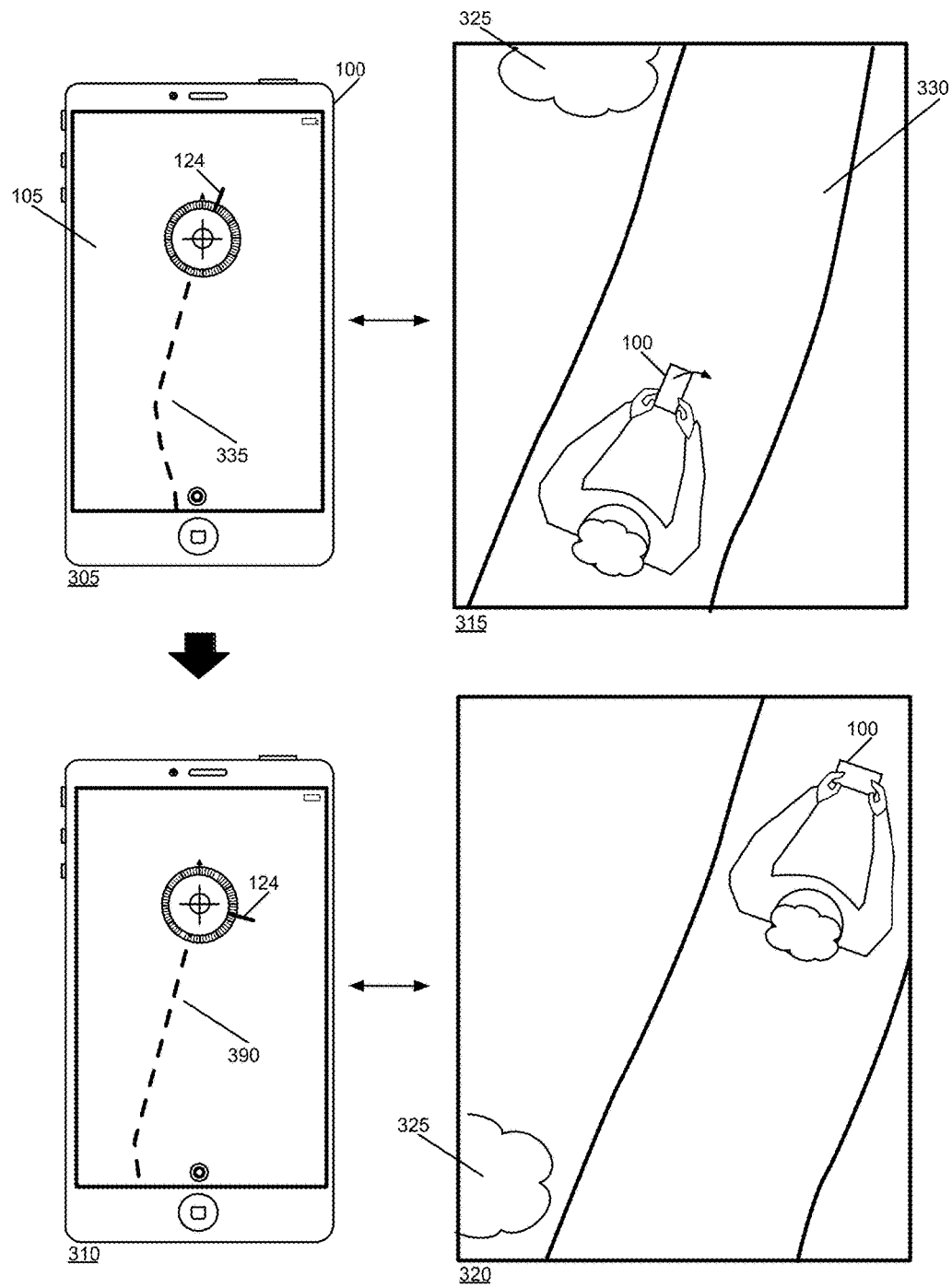
FIG. 3 presents an example of how the device independently updates the route representation and the orientation needle.

FIG. 3 presents an example to illustrate the device's independent updating of the route representation 122 and the orientation needle 124. This example is illustrated in terms of two operational stages 305 and 310 of the UI 105 of the device 100, and two top-down views 315 and 320 of the device as it travels along a road 330. In this example, as the device moves translationally between locations on the road 330 (one before a tree 325 and one after the tree 325), the user rotates the device by −90°. Accordingly, the first and second operational stages 305 and 310 show that as the route representation 335 expands in a 80° direction (as indicated by extension 390), the orientation needle rotates from an 80° direction to a minus 10° direction. As mentioned above, the device updates the orientation of the compass needle 124 based on the output of one or more of its sensors (e.g., its magnetometer), while updating the translation-movement representation by computing incremental translation movements based on its sensed or derived successive locations in the region.

Figure 4:
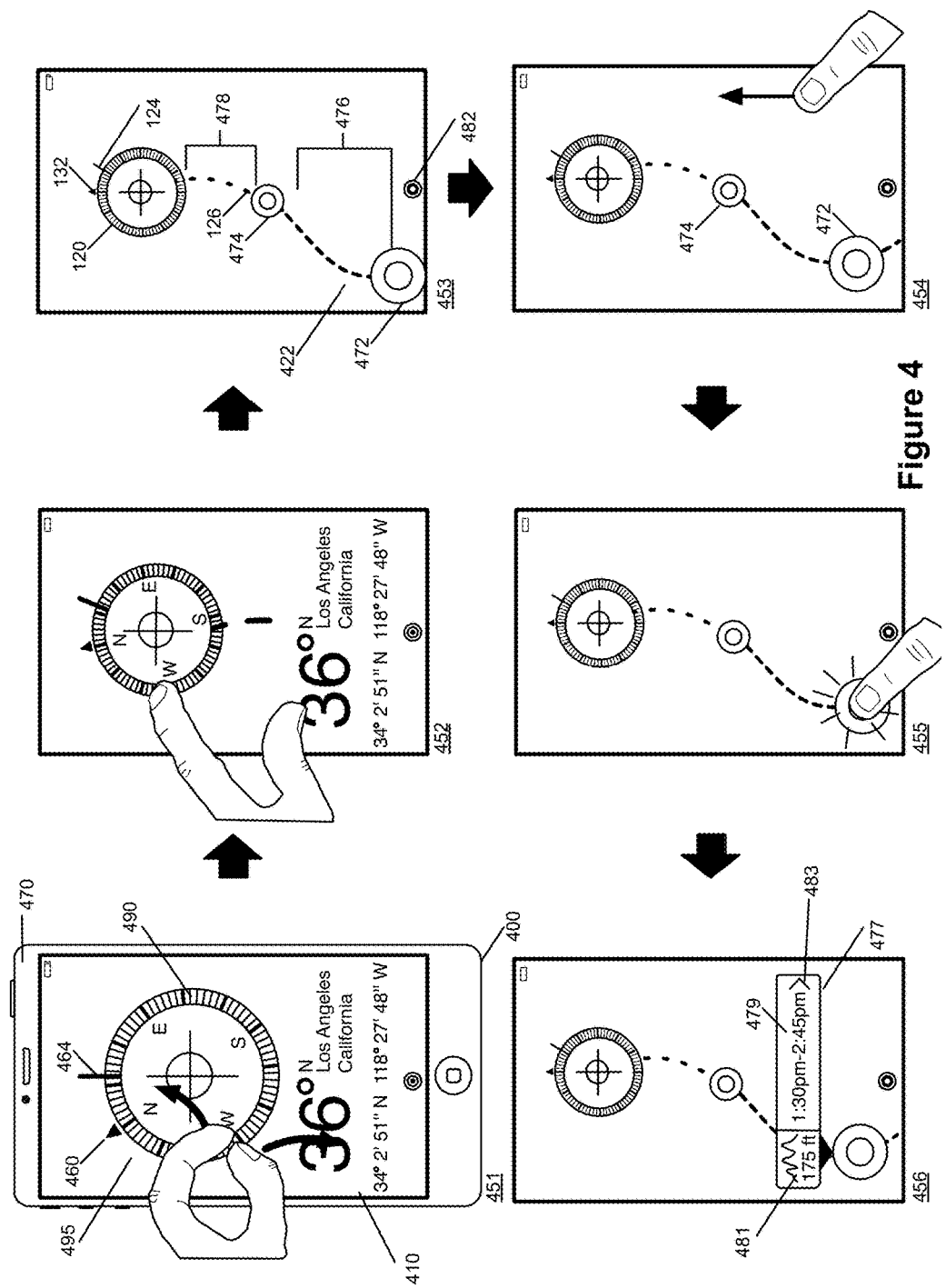
FIG. 4 illustrates a compass application that executes on a device to provide route review.

FIG. 4 illustrates a compass application that executes on a device 400 to provide (1) a route representation 422 to illustrate a device's prior route traversal in a region, and (2) a compass 120 at the end of the route to illustrate the device's current location and orientation. Even though this figure and other figures illustrate such a compass application, one of ordinary skill in the art will realize that in other embodiments, other types of applications or services of the device provide the route representation 422 and an orientation indicator, as described above by reference to FIG. 2.

The compass application has multiple modalities with one of these modalities being a compass modality and another modality being a route-review modality that presents the route representation 422 and the compass 120. In six operational stages 451-456 of a UI 410 of the compass application, FIG. 4 illustrates the transition between these two modalities of the compass application and user interaction with the route representation in the route-review modality.

The first operational stage 451 illustrates the compass modality of the compass application. In this mode, the application displays an electronic compass 495 that has (1) a north indicator 460 that identifies the magnetic north or true north direction, (2) a circle 490 that has angles about its circumference to identify different directions, (3) north, south, east, and west designations inside the circle 490, and (4) an orientation indicator 464 that identifies the orientation of the device with respect to the north direction 460, the direction designations inside the compass, and the specified angles of the compass.

The compass 495 can be presented in (1) a north-up view in which the north direction indicator 460 fixedly points to the top of the compass presentation, or (2) a device-orientation up view in which the current-orientation indicator 464 fixedly points to the top of the compass presentation. The first stage 451 shows the compass in the device-orientation view, as the orientation indicator 464 points towards the top 470 of the device 400 as the device rotates, while the circle 490 rotates below the indicator 464. One example of such an electronic compass is the electronic compass of the iPhone of Apple Inc.

The first operational stage 451 also illustrates the user performing a pinch-out operation by placing two fingers in close proximity on a touch-sensitive screen of the device 400 and then pulling these two fingers away from each other. This operation initiates an animation that shows the compass application switching between its compass modality and its route-review modality. As shown in the second and third operational stages 452 and 453, this animation iteratively shrinks and rotates compass 495 until it become the current-location identifying compass 120 in a north-up view. While the compass is shrinking, the animation presents more and more of the route representation 422 until it presents the north-up representation of the route that is shown in the third stage 453. The north indicator 132 of the compass 120 points to the top 490 of the device 400 to indicate that the route representation illustrated in the third stage is a north-up representation.

A mode indicator 482 in the third stage indicates that the compass application has switched between the compass mode of the first stage 451 and the route-review mode of the third stage 453. Specifically, this indicator appears in each of the operational stages of the UI 410. This indicator has three concentric circles that correspond to three of the modalities of the compass application. These three modalities include the compass mode, the route-presentation mode, and a level mode. In the level mode, the application provides reading that specifies the rotation angle of a surface. Example of such a level mode is the level mode offered by the compass application of the iPhone of Apple Inc.

Figure 5:
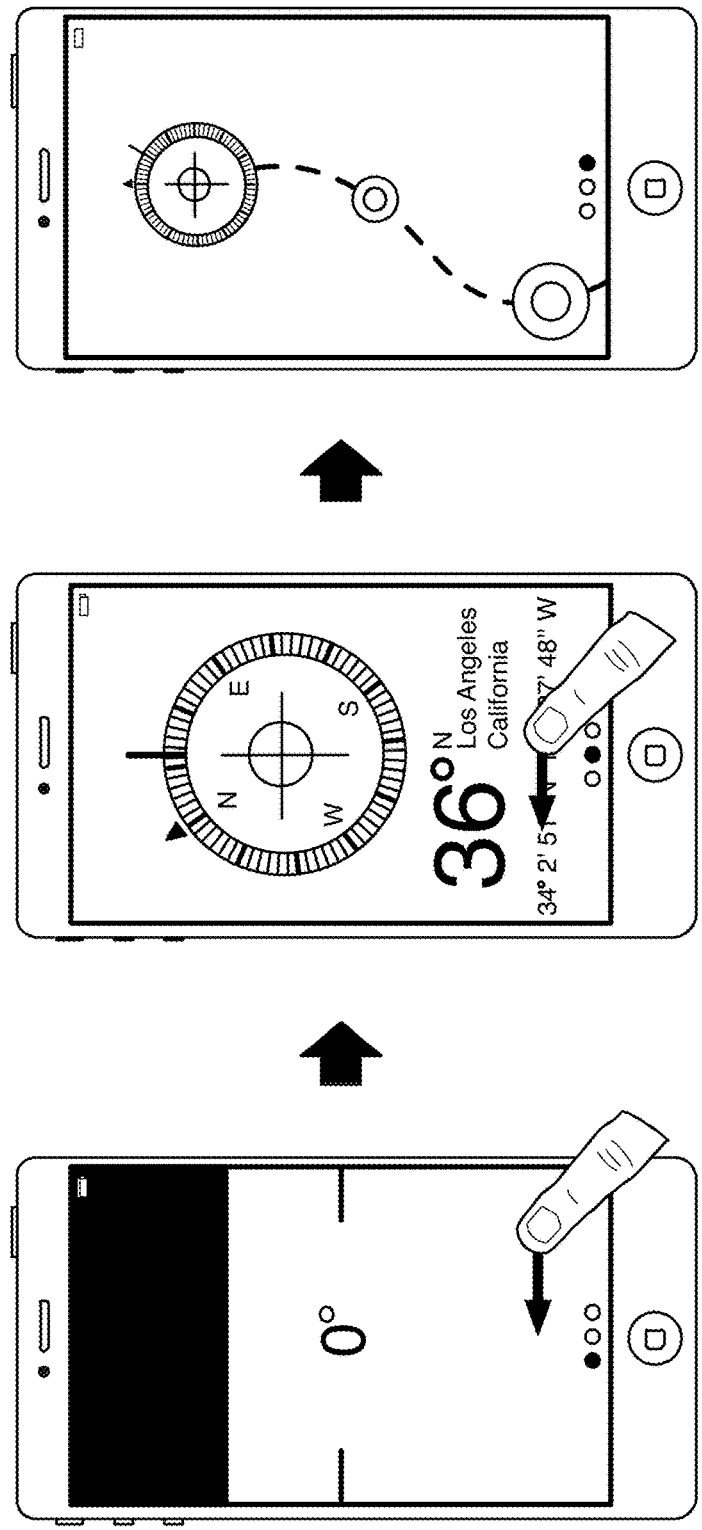
FIG. 5 demonstrates how a compass application allows a user to switch between two modalities by swiping a single finger across the device's screen.

In the first stage, the mode indicator 482 highlights the circle that relates to the compass mode, while in the third stage 453, the mode indicator 482 highlights the circle that relates to the route-presentation mode. The third circle in the mode indicator corresponds to the level mode. In some embodiments, the application enters the level mode through another gestural input (e.g., a pinch-in operation while the application is displaying the electronic compass 495). In different embodiments, the compass application provides different mechanisms to switch between any two of the three modes. For instance, instead of the above-described pinch-in and pinch-out operations, the compass application allows a user to switch between two modalities by swiping a single finger across the device's screen, as shown in FIG. 5. FIG. 5. further shows that the compass, route-presentation, and level modes, in some embodiments, appear as if they are on three different pages of the compass application, which the user can swipe through by moving a finger across the device's touch sensitive screen. FIG. 5 also illustrates that the indicator in some of these embodiments includes three aligned shapes (e.g., circles). As shown, each of these shapes corresponds to one of the pages that presents one of the modalities.

As shown in the third stage 453 of FIG. 4, the compass application in the route-presentation mode illustrates the route taken by the device 400 in terms of two components: (1) the displayed route representation 422 to represent the device's past translational movement within the region, and (2) the compass 120 at the end of the route to illustrate the device's current location and orientation. The compass 120 in FIG. 4 is identical to the compass 120 in FIG. 1, and will not be described further.

The route representation 422 is also similar to the route representation 122 of FIG. 1, in that it is formed by several discrete location identifiers 126 that identify some or all of the locations along a route traversed by the device. However, the route representation 422 of FIG. 4 shows different densities of location identifiers 126 and different appearances of some of these identifiers. In some embodiments, the higher density of identifiers in the sub-region 476 is indicative of the device's slower speed of travel in this sub-region, while the lower density of the identifiers in the sub-region 478 is indicative of the device's faster speed of travel in this sub-region.

In the route representation 422, two of the location identifiers 472 and 474 are larger than the other location identifiers. These two identifiers specify localities along the route at which the device stayed for a certain threshold amount of time, and/or at which the device recorded a threshold amount of location samples or other data. Such localities in the description below are referred to as temporal or high data localities (also called temporal or high data sub-regions). U.S. patent application Ser. Nos. 14/081,895, 14/020,689, and 14/022,099 describe methods that identify localities based on duration of the devices stay and/or the number of captured location sample data. These three U.S. Patent Applications are incorporated herein by reference.

The localities 472 and 474 are selectable items in the device's UI, which upon their selection, provide information about their corresponding locations, as further described below by reference to the fifth and sixth stages 455 and 456. In some embodiments, the rest of the location identifiers 126 are not selectable elements. In other words, unlike the localities 472 and 474, a user cannot select the rest of the location identifiers to see information about the locations that they represent. In other embodiments, these other location identifiers are also selectable items that upon their selection, provide information about their corresponding locations.

Also, as it is illustrated in stage 453, locality 472 has a different appearance than the locality 474 (i.e., locality 472 is displayed as bigger circles than locality 474). This is because in some embodiments, depending on the duration of time that the device has stayed on each locality, the appearance of that locality differs from other localities. For instance, in the illustrated example, the device has stayed at locality 472 for 1 hours and 15 minutes (i.e., from 1:30 pm to 2:45 pm) while it has stayed for only 45 minutes at locality 474 (not shown in the figure). In some embodiments, the localities' appearances are different in size when their stay time durations are different, while in other embodiments they have different colors. Other embodiments use other indicators (e.g., different graphical constructs) to differentiate between the localities' appearances.

Once the route representation 122 is shown in the third stage 453, the user can scroll up and down along this representation. For instance, the fourth stage 454 shows the user scrolling down along this representation by performing a single-finger swipe up gesture. As shown in the fifth stage 455, this gesture moves the locality 472 that was on the periphery of the displayed route presentation to be completely within the displayed presentation.

The fifth stage 455 also shows the user selecting the locality 472. As shown in the sixth stage 456, this selection causes the compass application to present a banner 477. This banner is a display area that displays certain amount of information about the selected locality. In this example, this information includes a range of time 479 and altitude data 481. The temporal range 479 represents the time period during which the device was at the locality 472. The altitude data 481 represents the altitude of the location represented by the locality 472. The altitude data is provided by the compass application because in some embodiments the route-presentation mode is used to provide route guidance to hikers.

In some embodiments, the compass application provides the altitude or current elevation information based on data provided by one or more sensors of the device. One of the sensors that provides data to the compass application of some embodiments to measure the current altitude of the device is the device's barometer. The barometer of the device in some embodiment is calibrated against the weather in localities that the device stays for a threshold period of time. In some embodiments the barometer is calibrated periodically and/or at certain times of day (e.g., overnight).

The compass application of some embodiments does not display the elevation data when the contributing data provided by the device's barometer seems to be inaccurate. The accuracy of the data in some embodiments can be evaluated by comparing the data provided by the barometer against other data provided by other sensors and/or applications of the device (e.g., device's GPS, map application, etc.). In some embodiments, when such data is known to be inaccurate, the compass application displays the altitude information based on the degree of inaccuracy that it has evaluated (e.g., if the inaccuracy is +/−250 feet, the compass application displays elevation changes in steps of 250 feet).

The portion 481 of the banner 477 that displays the altitude data serves as an affordance that directs the compass application to initiate a backtracking mode that assists the user to track back along the displayed route, as further described below by reference to FIG. 8. In addition to this affordance, the banner 477 includes a control 483 that directs the compass application to provide additional information about the locality 477, as further described below by reference to FIG. 6.

In the example illustrated in FIG. 4, the route representation 422 is displayed over a single-color backdrop (e.g., over a black backdrop with the location identifiers and other controls and text appearing in white). In other embodiments, the route representation appears over a roadway map of the region traversed by the device. In still other embodiments, the route representation appears over topological map of the region traversed by the device.

Figure 6:
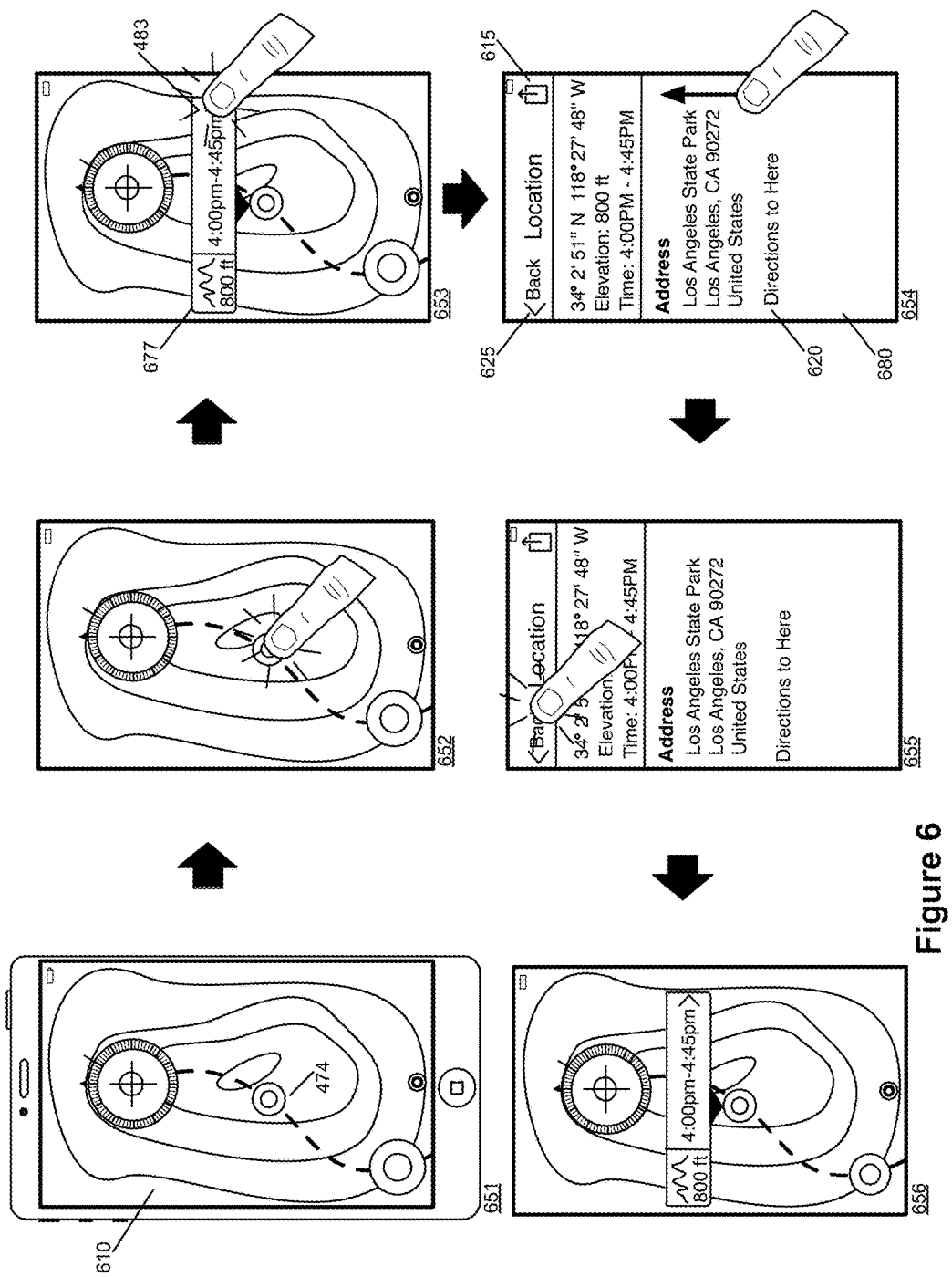
FIG. 6 illustrates an example that shows a route representation appearing over a topological map of a region.

FIG. 6 illustrates an example that shows the route representation 422 appearing over a topological map of the region. This example also illustrates using the banner control 483 to obtain additional information regarding a locality along the route. This example is illustrated in terms of six operational stages 651-656 of a UI 610 of a compass application.

The first stage 651 shows the route representation appearing over a topological map of the region traversed by the device. A topological map is a map of the topography of the region. It includes several geometric shapes with curved boundaries to represent different land portions and elevations. In some embodiments, the compass application initially presents the route representation over a single-color backdrop, and then presents it over the topological map once the topological map data becomes available (e.g., once this map data has been downloaded). In other embodiments, the compass application includes a control (not shown) that allows a user to controllably request the topological map. In some embodiments, this control is available during the route-presentation mode, while in other embodiments, this control is part of the preference settings of the compass application.

The second stage 652 shows the selection of the locality 474. This selection directs the compass application to show a banner 677, as shown in the third stage 653. The banner shows that the locality is at 800 feet and that the device was at that locality from 4:00-4:45. The third stage 653 also shows the selection of the control 483.

The fourth stage 654 shows a page 680 that is displayed in response to the selection of the control 483. This page displays additional information about the locality 474. This information includes location data, such as longitude, latitude, altitude of the particular location, as well as temporal data, such as the time at which the device was at that particular location. As shown in the fourth stage 654, the user can scroll up and down (e.g., by swiping up and down) along this page to see the displayed information when not all of the information can fit within one page.

The page 680 also includes several controls 615, 620, and 625. The control 615 is for sharing this locality with other devices through one or more communication mechanisms. Examples of these mechanisms include email, text message, social media post (e.g., tweet, Facebook post), wireless communication (e.g., AirDrop of Apple Inc.), etc. The control 620 allows a user to start a backtracking mode that guides the user back to the locality 474 from the current location of the device. This mode will be further described below. The control 625 allows the user to go back to the route presentation. As shown in the fifth and sixth stages 655 and 656, the selection of this control directs the compass application to return to the route presentation.

Different embodiments display different data for a selected locality. As shown in the fourth stage 654 of FIG. 6, the data displayed for a locality includes location data (e.g., longitude, latitude, altitude of the particular locality) and temporal data (e.g., time period during which the device was at that particular locality) in some embodiments. In other embodiments, the data displayed for a locality includes non-location and non-temporal data that the device recorded for the locality while being at the locality.

Figure 7:
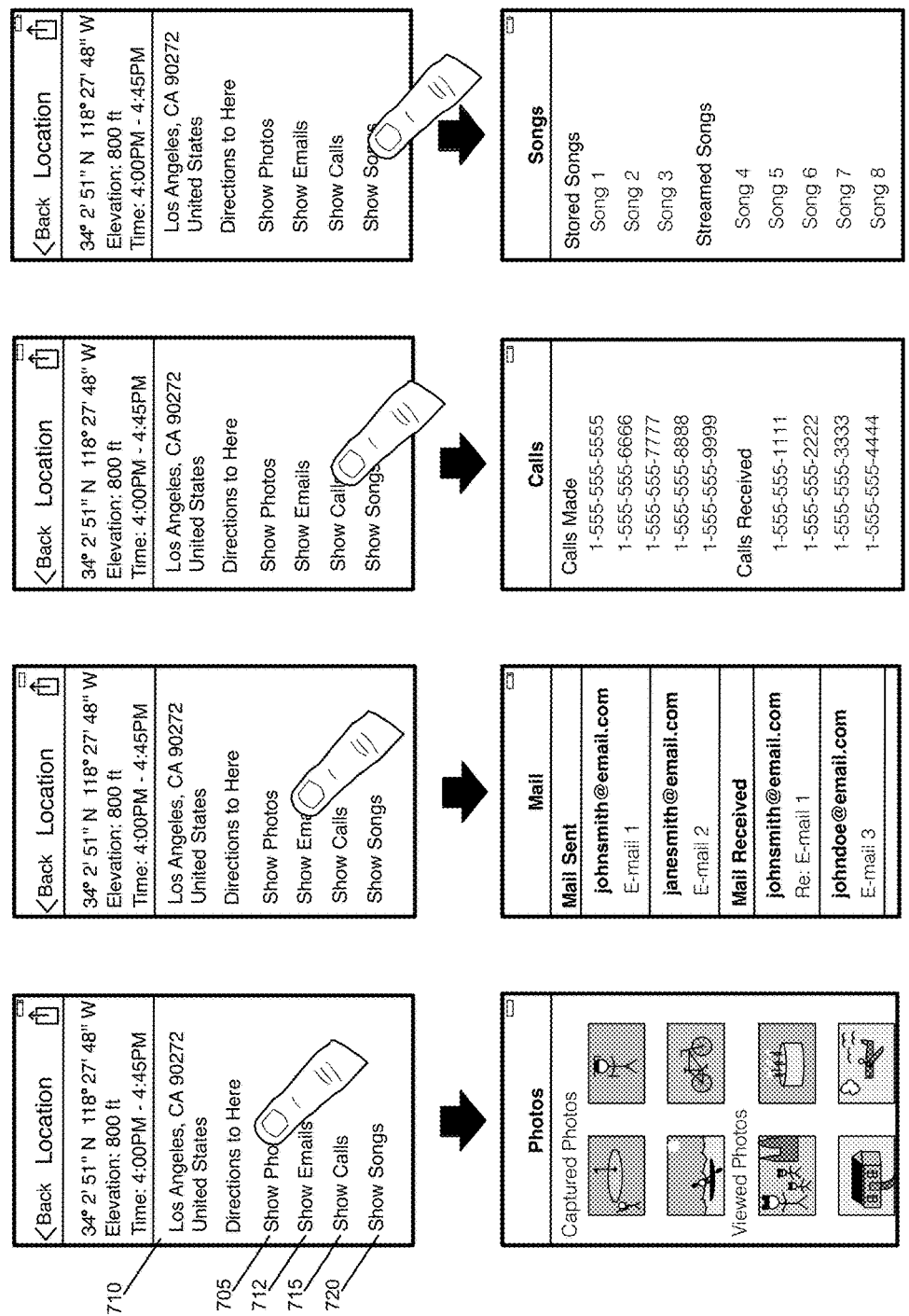
FIG. 7 illustrates several examples of non-location and non-temporal data that a device records and displays for a selected locality.

FIG. 7 illustrates several examples of non-location and non-temporal data that the device 400 records and displays for the selected locality 474 in some embodiments. As shown, the displayed, recorded data types that are shown on the information page 710 (that is presented upon selection of the control 483 in the banner 677) in some embodiments include (1) images captured by the device at this locality, (2) emails sent, received and/or reviewed by the device at the locality, (3) phone calls made or received by the device at the locality, and (4) song played, downloaded, and/or purchased by the device at the locality. Examples of other communications include text messages sent, received, and/or reviewed at the locality, and other content (e.g., videos, documents, voicemails, etc.) viewed, downloaded, or listened to at the locality.

FIG. 7 shows that (1) upon selection of a photo control 705, the device displays several photos that it took at the locality 474, (2) upon selection of an email control 712, the device displays several emails that it sent or presented at the locality 474, (3) upon selection of a call control 715, the device displays several calls that it made or received at the locality 474, and (4) upon selection of a song control 720, the device displays several streamed or locally stored songs that it played at the locality 474.

In different embodiments, the device 400 uses different mechanisms to record and retrieve content for a particular locality. These mechanisms will be further described below by reference to FIGS. 19 and 20. Also, while the example in FIG. 7 shows that some embodiments display non-location and non-temporal data for a locality that interconnects with other localities along a route, other embodiments display such data for localities without displaying routes that interconnecting the localities. One such embodiment will be further described below by reference to FIG. 16.

As mentioned above, the compass application allows a user to initiate a backtracking mode from the route-presentation mode by either selecting the portion 481 of the banner 477, or the control 620 on the info page 680. The backtracking mode guides the device back to a selected locality by providing one or more feedback indicators to assist with the alignment of the current orientation needle with the route representation as the device traverses backwards along a route to the location. These feedback indicators, as described above and below, include visual feedbacks, audio feedbacks, haptic feedbacks, etc.

Figure 8:
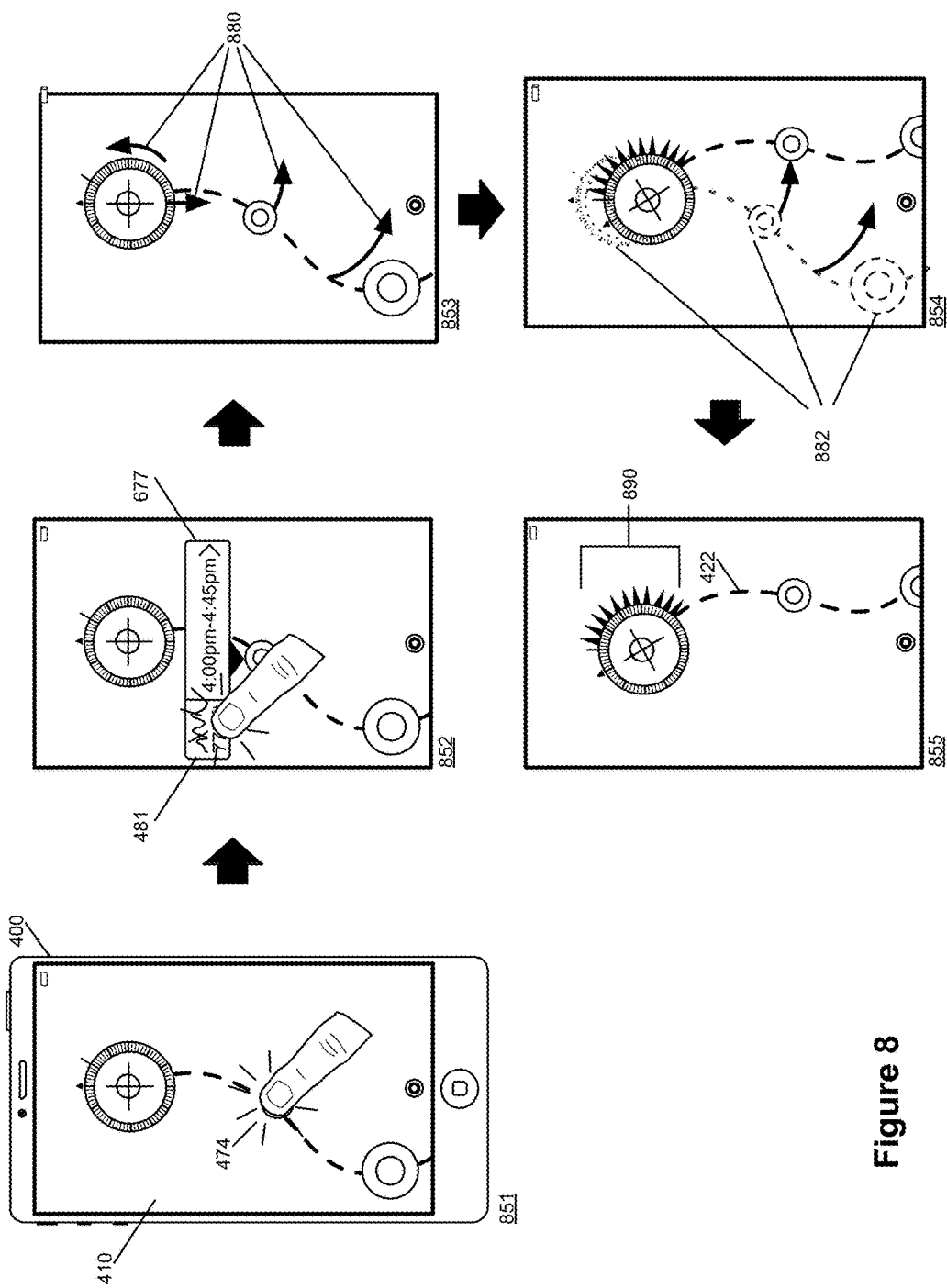
FIG. 8 illustrates the backtracking mode in a device of some embodiments.

FIG. 8 illustrates the backtracking mode of some embodiments of the invention. This example is illustrated in terms of five operational stages 851-855 of the UI 410 of the device 400. The first stage 851 shows the user selecting the locality 474 on the route representation 422. In response to this selection, the banner 677 is presented, as shown in the second stage 852. At this stage, the user selects the backtracking control 481 in the banner.

The selection of this control starts an animation that smoothly transitions the compass application from the route-presentation mode displayed in the first and second stages 851 and 852 to the backtracking mode displayed in the fifth stage 855. During this transition, the route and the compass 120 (1) move down to position the compass 120 closer to the center of the device's display screen (e.g., moves the compass from a position that is one fifth of the screen's length from the top of the screen to a position that is two fifths away from the top of the screen), and (2) rotate to transition from a north-up view (which has the compass' north indicator 132 pointing up to the top of the presentation) to a device-orientation up view (which has the current-orientation indicator 124 pointing up). The movement and rotation are illustrated in the third stage 853 by the arrows 880, and in the fourth stage 854 by the shadow copy 882 of the route representation and the localities.

The fifth stage 855 shows the application once it has entered into its backtracking mode. As shown in this stage, the application has added visual misalignment indicators 890 about the compass between the location of the current-orientation needle 124 and the route representation 422. These misalignment indicators visually represent the degree of misalignment between the current orientation of the device and the orientation at which the device should start its traversal back along the route. By rotating the device, the user can reduce these visual indicators and eventually eliminate them when the needle 124 is aligned with the direction of backward travel.

Figure 9:
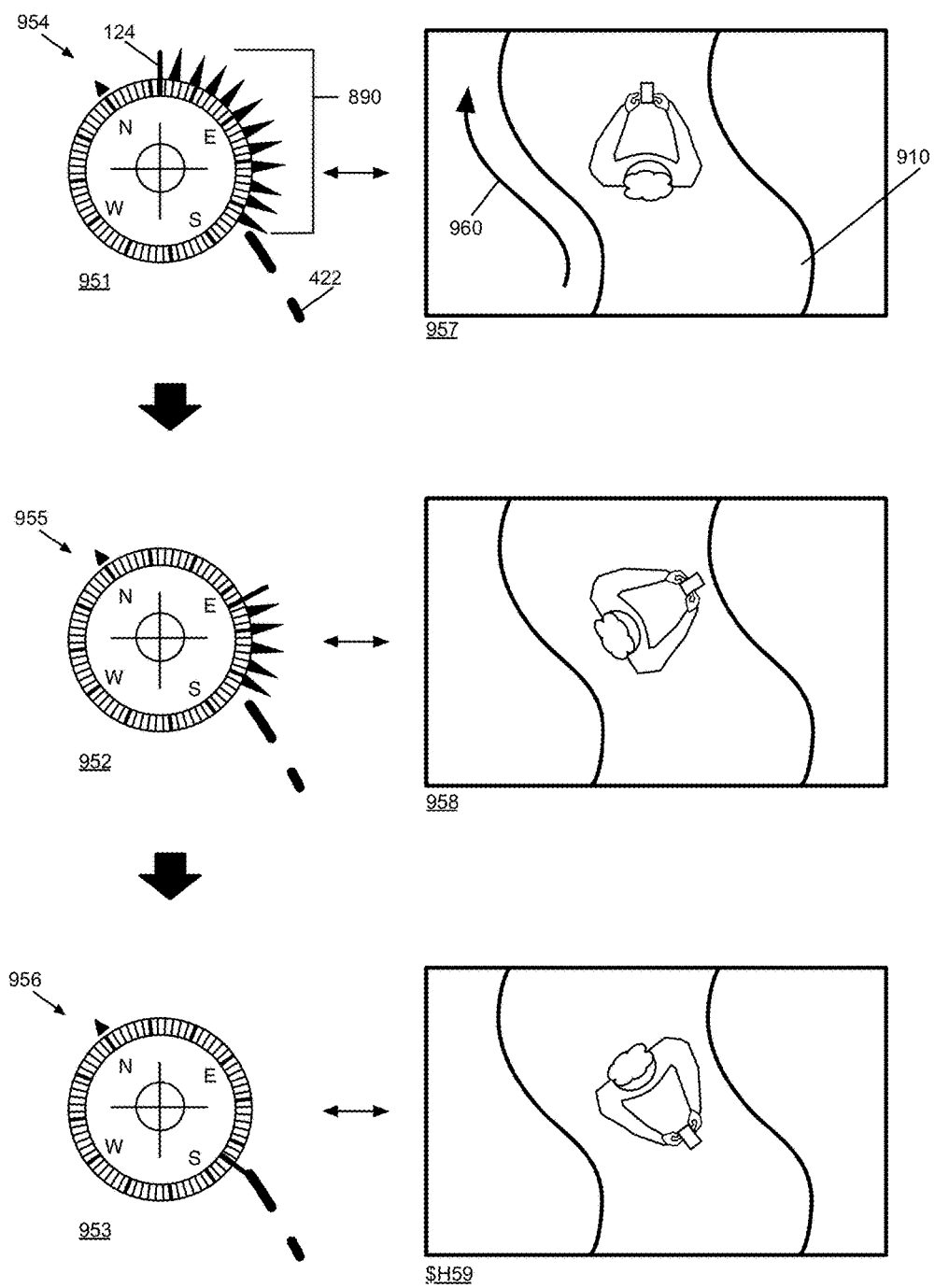
FIG. 9 illustrates an example of eliminating the misalignment indicators as a device is rotating.

FIG. 9 illustrates an example of eliminating the misalignment indicators 890 as the device is rotated to align the orientation needle 124 with the route representation 422, before the user starts to travel back along a route 910. This example is illustrated in terms of three stages 951-H53, with each stage having an operational UI stage 954, 955, or 956 and a top-down view 957, 958, or 959 of a user and his device as the user rotates the device to travel backwards along the route 910.

The first stage 951 corresponds to the fifth stage 855 of FIG. 8. In the first stage 951, the device is pointing in the forward direction of the route that it was previously traversing, as indicated by the arrow 960 that shows the prior direction of travel. The second stage 952 shows the user and the device after the user has rotated about 90° in the clockwise direction. In response to this rotation, the orientation needle 124 rotates by almost 90° in the clockwise direction, as shown by the second UI stage 955. This rotation eliminates about half of the misalignment indicators 890, as the rotation cuts in half the misalignment between the device's current orientation and the orientation for starting the backward traversal. In the example illustrated in FIG. 9, while the needle 124 rotates, the route presentation maintains the orientation that it had when the backtracking mode started.

The third stage 953 shows the user and the device after the user has rotated another 30° in the clockwise direction. In response to this rotation, the orientation needle 124 rotates by another 30° in the clockwise direction, as shown by the third UI stage 956. This rotation eliminates the remainder of the misalignment indicators 890, as this rotation aligns the device's current orientation and the last portion of the route representation. At this point, the user can start traveling back along the route 910.

Figure 10:
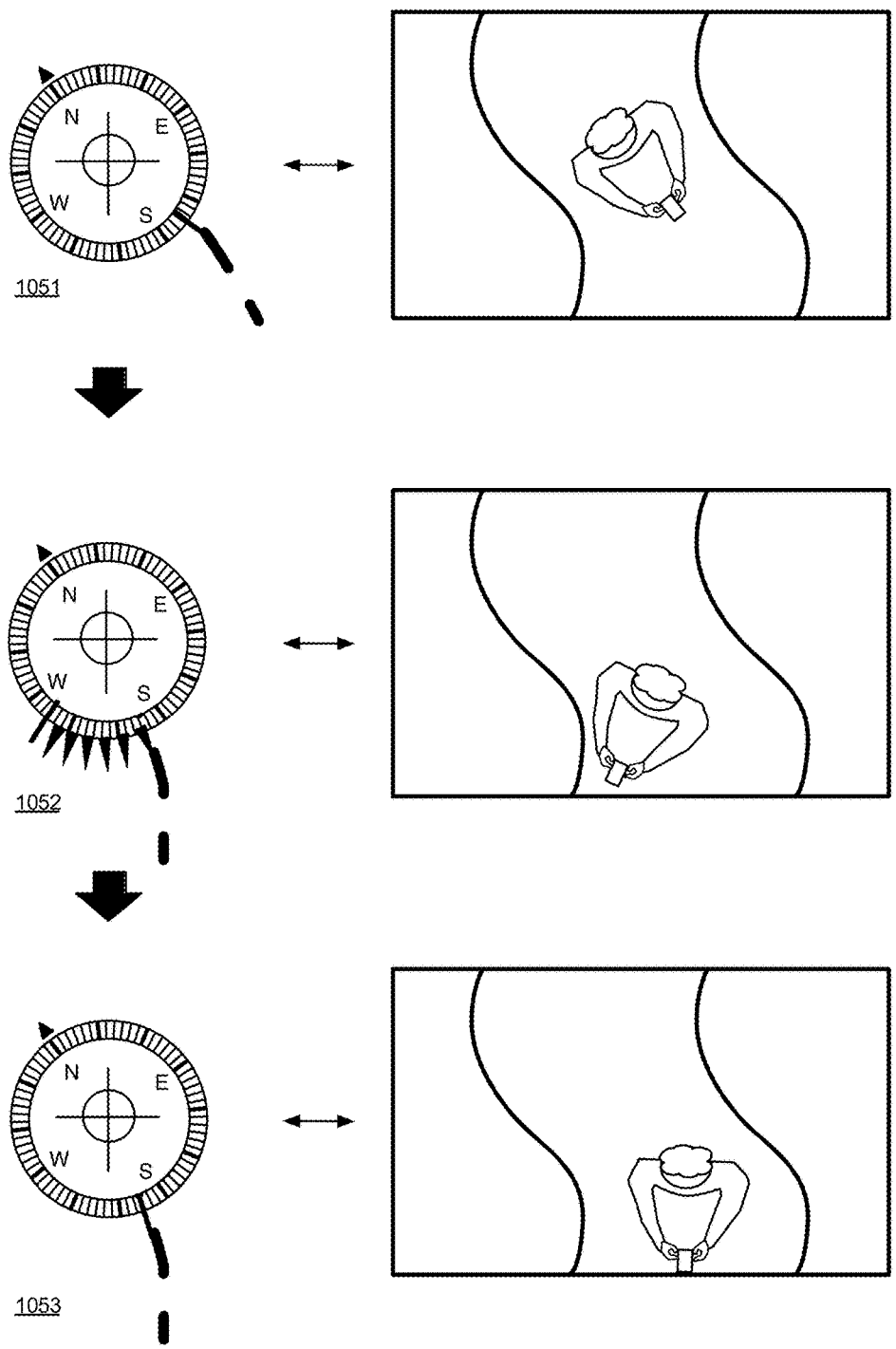
FIG. 10 illustrates an example of the presentation of misalignment indicators during a backward traversal.

As the user travels back along the route, the compass application presents misalignment indicators whenever the orientation of the device strays from the desired backward direction of the travel along the route. FIG. 10 illustrates an example of the presentation of such misalignment indicators during the backward traversal. Specifically, in three stages 1051-1053, it shows the user (1) initially traveling correctly back along a route, as indicated by the absence of misalignment indicators in the first stage 1051, (2) subsequently straying off course, as indicated by the presentation of misalignment indicators 890 in the second stage 1052, and (3) rectifying his course, as indicated by the elimination of the misalignment indicators 890 in the third stage 1053.

Figure 11:
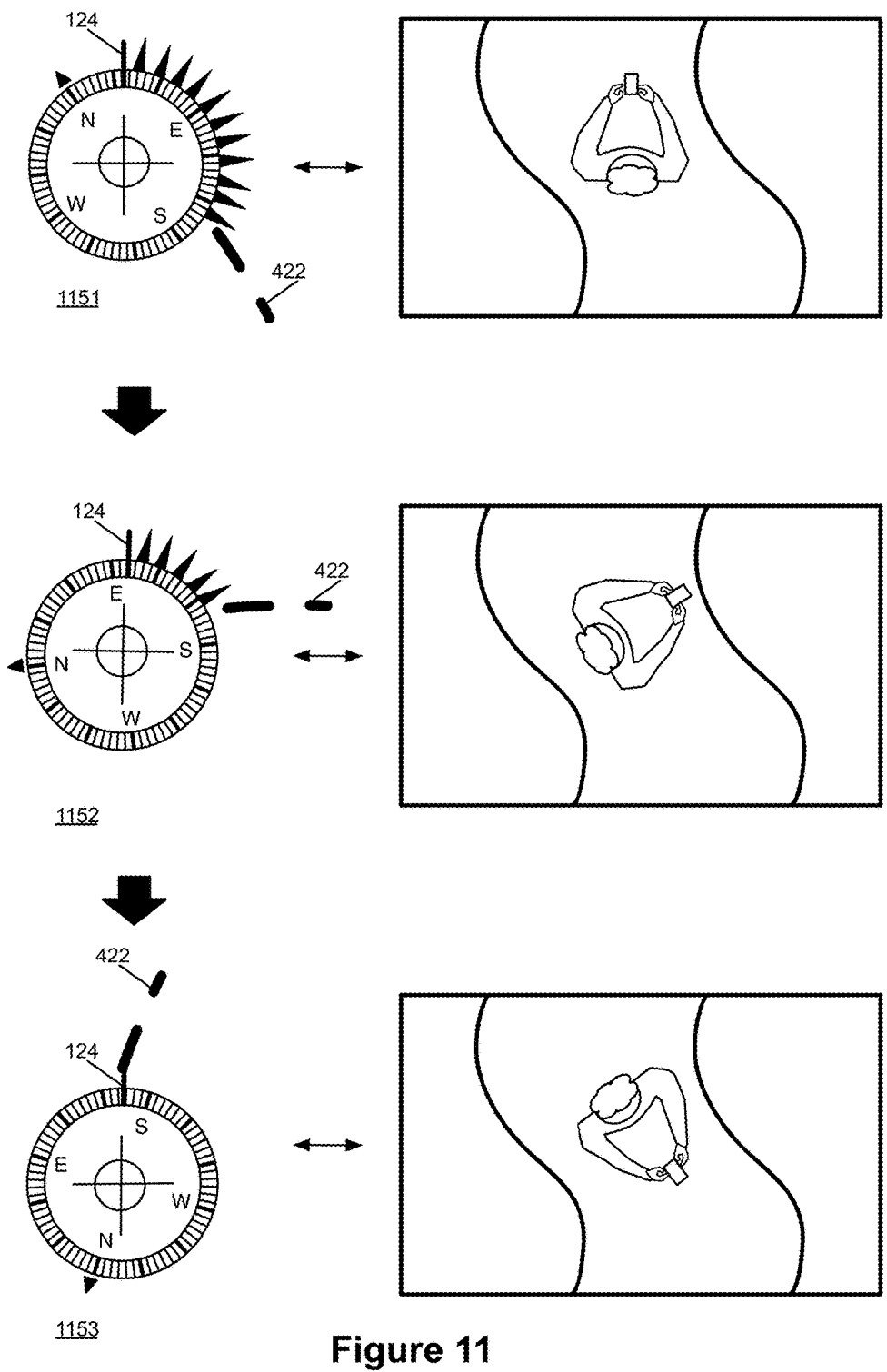
FIG. 11 illustrates an alternative approach of presenting the route while the device is being rotated to align it with the direction of the backward traversal.

FIGS. 9 and 10 illustrate just one manner for presenting misalignment indicators and reducing these indicators as the user aligns the device to the direction of the backward traversal. In some embodiments, the compass application employs other mechanisms for presenting or reducing these indicators. For instance, FIG. 11 illustrates, in three stages 1151-1153, an alternative approach of presenting the route while the device is being rotated to align it with the direction of the backward travel. In this approach, the current orientation needle 124 maintains its upwards direction as the compass 120 and route representation 422 rotate underneath it until the needle 124 and the route representation 422 are aligned. In this approach, the rotating route representation 422 eliminates the misalignment indicators 890.

Figure 12:
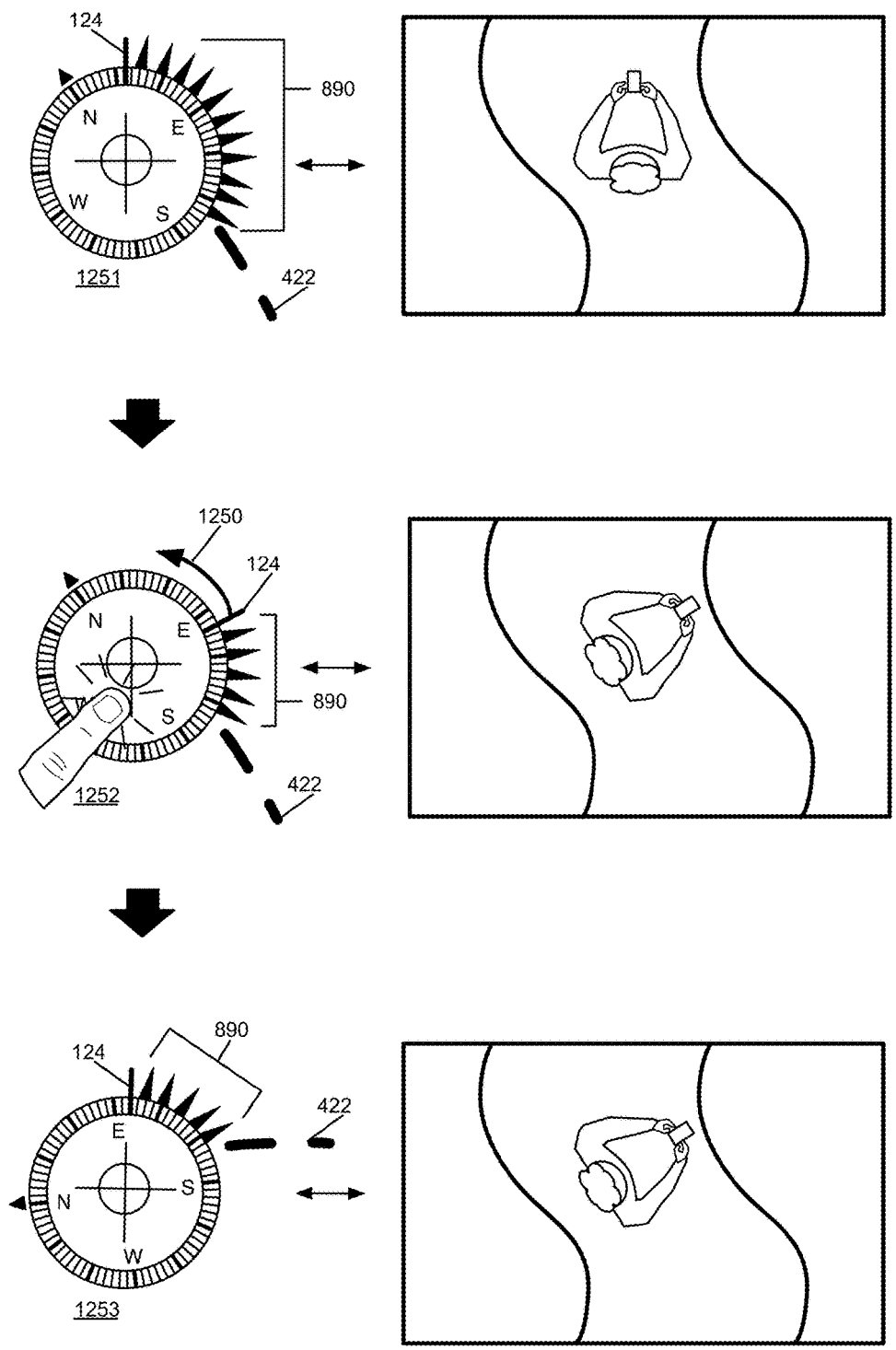
FIG. 12 shows the compass application either rotating the current-orientation needle or the route representation while the device is being rotated.

In some embodiments, the compass application employs both rotation approaches illustrated in FIGS. 9 and 11. For instance, in three operational stages 1251-1253, FIG. 12, shows the compass application either rotating the current-orientation needle 124 or the route representation 422 while the device is being rotated. The first stage 1251 is identical to the first stage 951 of FIG. 9. At this stage 1251, the application has just entered the backtracking mode.

The second stage 1252 is similar to the second stage 952 of FIG. 9 in that it shows the user and the device rotated by about 90° in the clockwise direction, the rotation of the orientation needle 124 by the same amount, and the elimination of about half of the misalignment indicators 890. However, the second stage 1252 also shows the user tapping on the compass 120. The selection of this compass during this modality directs the compass application to switch between the mode in which the needle 124 rotates to the mode in which the route representation rotates. As indicated by the arrow 1250, the switch causes the orientation needle 124, the misalignment indicators 890 and route representation 422 to rotate counterclockwise until the orientation needle 124 points up. This rotation is presented as an animation in some embodiments.

The third stage 1253 shows that after the compass 120 is selected, the backtracking presentation switches to the presentation that is similar to the presentation in the second stage 1152 of FIG. 11. Even though FIG. 12 shows the backtracking mode starting with the needle-rotating mode, the backtracking mode in some embodiments starts in the route-representation rotating mode and then switches to the needle-rotating mode upon selection of the compass.

Figure 13:
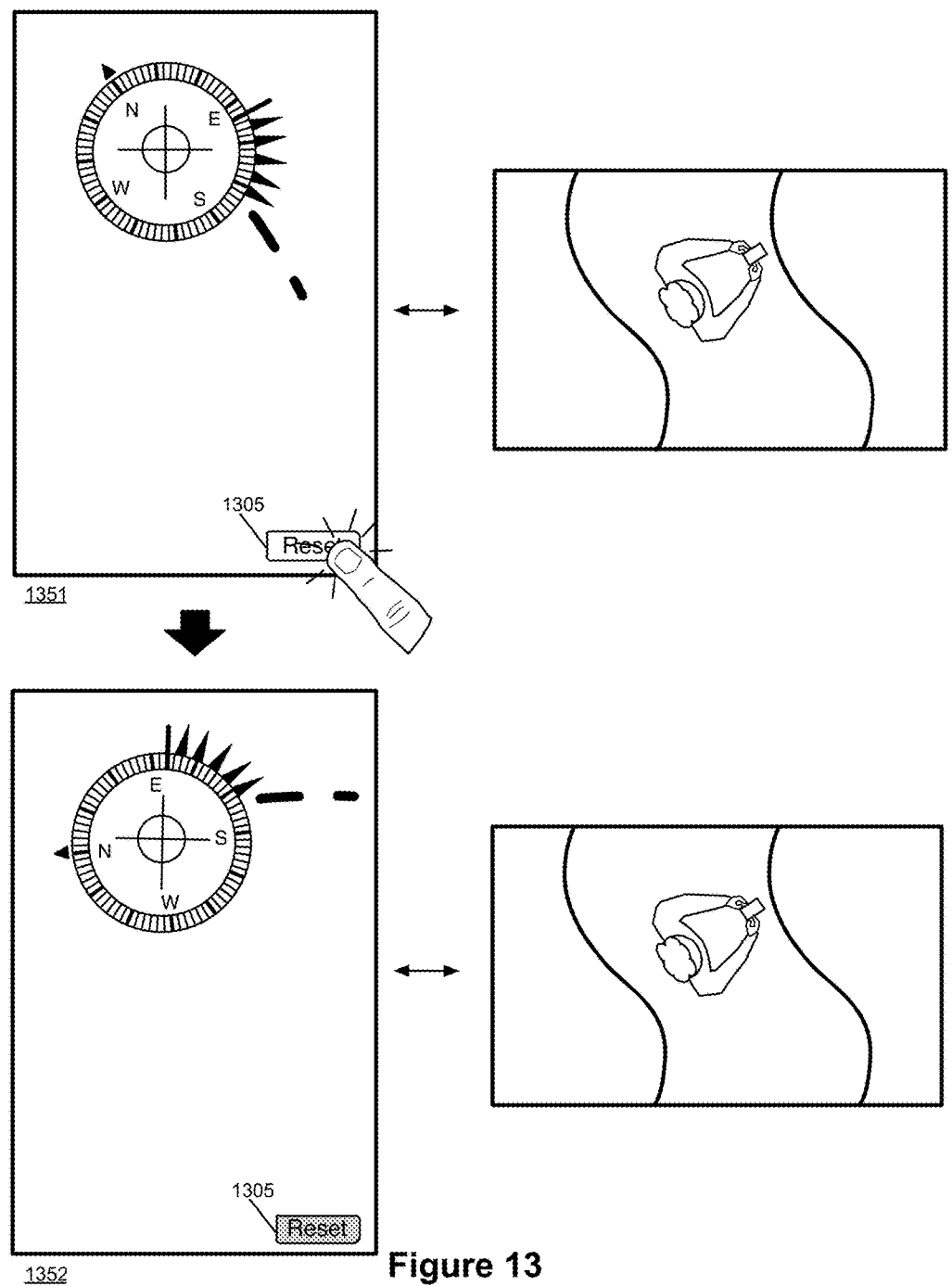
FIG. 13 illustrates a reset control that when selected resets the presentation from whatever orientation it has to a needle-up view.

In some embodiments, the compass application includes other controls for resetting the orientation of the route representation 422 based on the orientation of the device. FIG. 13 illustrates one such control. Specifically, it illustrates a reset control 1305 that when selected resets the presentation from whatever orientation it has to a needle-up view. The example in FIG. 13 is illustrated in two stages 1351-1352. The first stage 1351 is similar to the second stage 952 of FIG. 9, except that in the first stage 1351 the user selects the reset control 1305. Upon this selection, the compass application switches the backtracking presentation to the needle-up view from the rotated-needle view of the first stage 1351. In making this switch, the compass application provides an animation that has the compass 120, the needle 124 and the route representation 422 rotate counterclockwise until the needle 124 is pointing up in the presentation.

In addition to the misalignment indicators 890, the compass application provides other visual indicators in some embodiments. For instance, in some embodiments, the application provides a red hue over the route presentation while the needle 124 is not aligned with the route representation. The application then removes this red hue, and in some embodiments, replaces it with a blue hue, when the needle is aligned with the route representation. Other embodiments use other color shades to provide colorcasts or other color indicators to express the alignment or misalignment of the device during the backtracking mode. Also, other embodiments provide other types of visual indicators of the misalignment or alignment of the needle 124 with the route representation 422. Still other embodiments provide other types of alignment or misalignment indicators, such as sound/audio indicators or haptic indicators. For instance, some embodiments generate sounds or vibrations when the needle 124 and the route representation 422 are aligned or misaligned.

Figure 14:
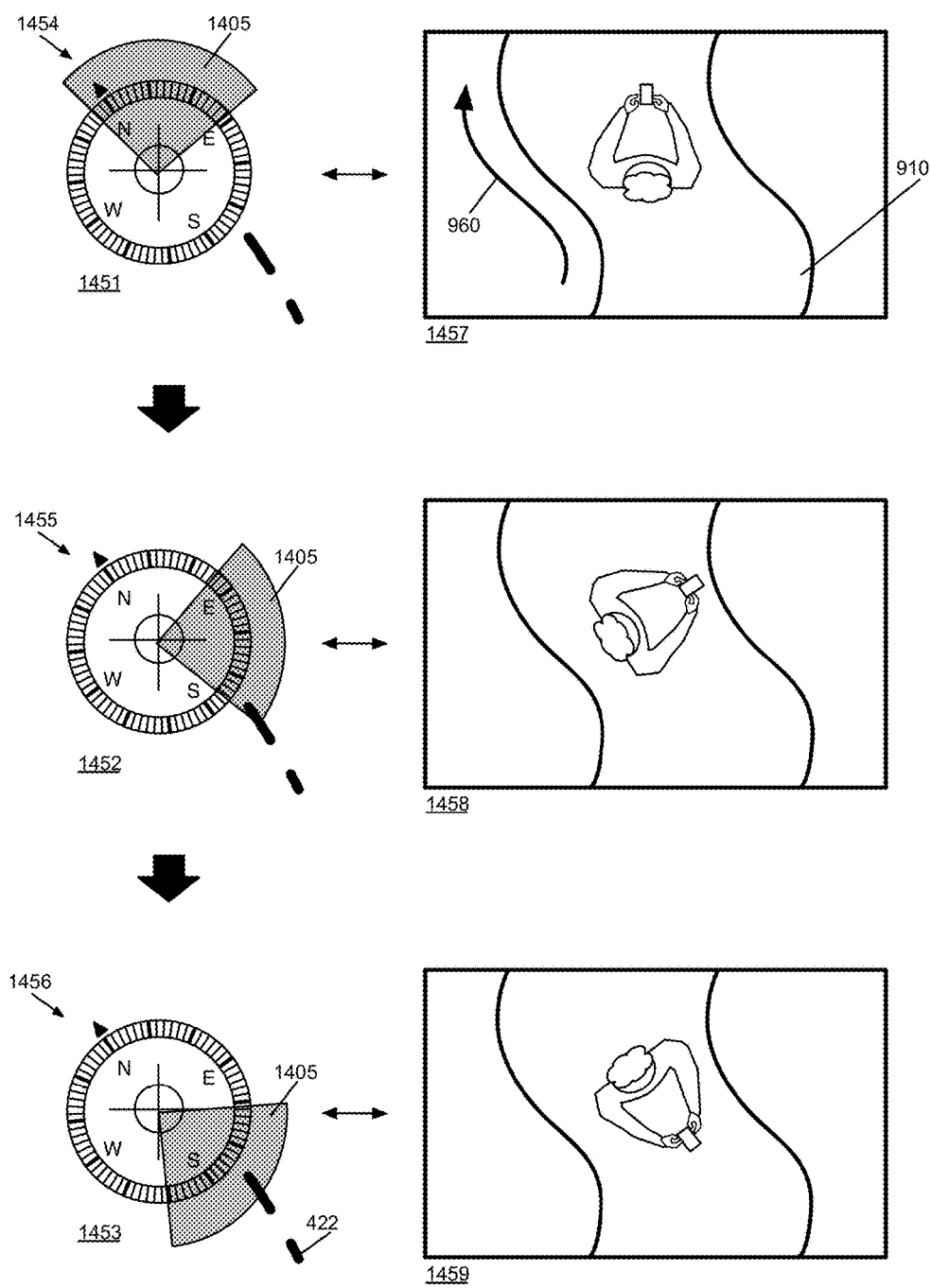
FIG. 14 illustrates the use of other user interface (UI) constructs to align the direction of the device's travel with the previously traveled route.

Still other embodiments forego the use of the needle 124 and indicators 890 during the backtracking mode, and instead use other UI constructs to align the direction of the device's travel with the previously traveled route. FIG. 14 illustrates one such alternative approach. In this approach, the misalignment indicators are not used, and the needle 124 is replaced by the direction region identifier 1405. This identifier specifies the heading direction of the device in terms of a general region. Such an approach is useful as in some instances, the orientation needle might not be perfectly accurate or a user might have a hard time maintaining the alignment between the needle 124 and the route representation. In such situations, the region identifier 1405 provides a less restrictive way of (1) identifying the heading direction of the device more generally and (2) maintaining the general alignment of the heading direction of the device with the route representation.

The example in FIG. 14 is illustrated in three stages 1451-53, with each stage having an operational UI stage 1454, 1455, and 1456 and a top-down view 1457, 1458, or 1459 of a user and his device respectively as the user rotates to align the direction of the device to travel backwards along the route 910. The first stage 1451 shows the start of the backtracking mode in some embodiments. This stage is similar to the fifth stage 855 of FIG. 8, except the needle 124 has been replaced by the direction identifying region 1405. In the first stage 1451, the device is pointing in the forward direction of the route that it was previously traversing, as indicated by the arrow 960 that shows the prior direction of travel.

The second stage 1452 shows the user and the device after the user has rotated about 90° in the clockwise direction. In response to this rotation, the orientation identifying region 1405 rotates by almost 90° in the clockwise direction, as shown by the second UI stage 1455. While the orientation identifying region 1405 rotates, the route presentation 422 maintains its orientation that it had when the backtracking mode started.

The third stage 1453 shows the user and the device after the user has rotated another 30° in the clockwise direction. In response to this rotation, the orientation identifying region 1405 rotates by another 30° in the clockwise direction, as shown by the third UI stage 1456. This rotation results in the route representation 422 being centered within the region 1405 to indicate that the device is aligned with the previously traveled route and hence is ready to start its backward traversal. As noted above, the misalignment indicators 890 are not used in the backtracking traversal approach illustrated in FIG. 14. However, in other embodiments, the region-based approach illustrated in this figure uses these or other indicators as additional alignment or misalignment indicators during the backwards travel of the device.

Figure 15:
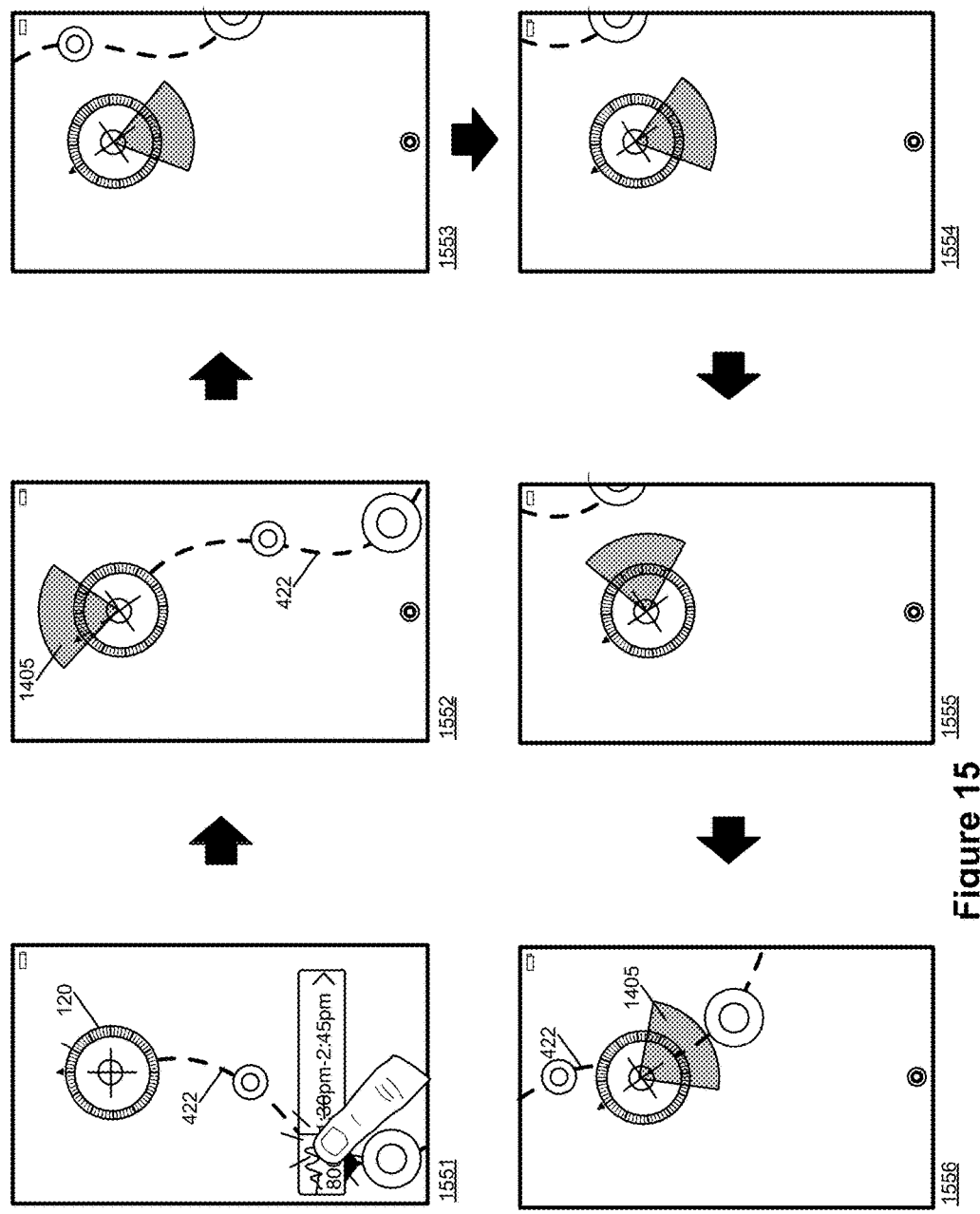
FIG. 15 illustrates an example that shows the utility of the orientation identifying region in assisting a user to get back on a route after traversing off of it in the backward traversal.

FIG. 15 illustrates an example that shows the utility of the orientation identifying region 1405 in assisting a user to get back on a route after traversing off of it in the backward traversal. The example is illustrated in six stages 1551-1556. The first two stages 1551 and 1552 illustrate the start of a backtracking mode. The third stage 1553 shows the compass 120 starting to stray off of the route representation 422, and the fourth stage 1554 shows the compass 120 completely off course.

The fifth stage 1555 shows the direction identifying region 1405 pointing towards the route representation 1522. The identifying region 1405 points to the route representation because the user rotates the device to point the identifying region towards this representation. Once pointed in this direction, the identifying region 1405 can guide the user to reach the route by showing the identifying region getting closer to the route representation as the user travels towards the route. The sixth stage 1555 shows the identifying region 1405 on top of the route representation 422 to indicate that the device is again aligned with the route and ready to continue its backward travel.

Figure 16:
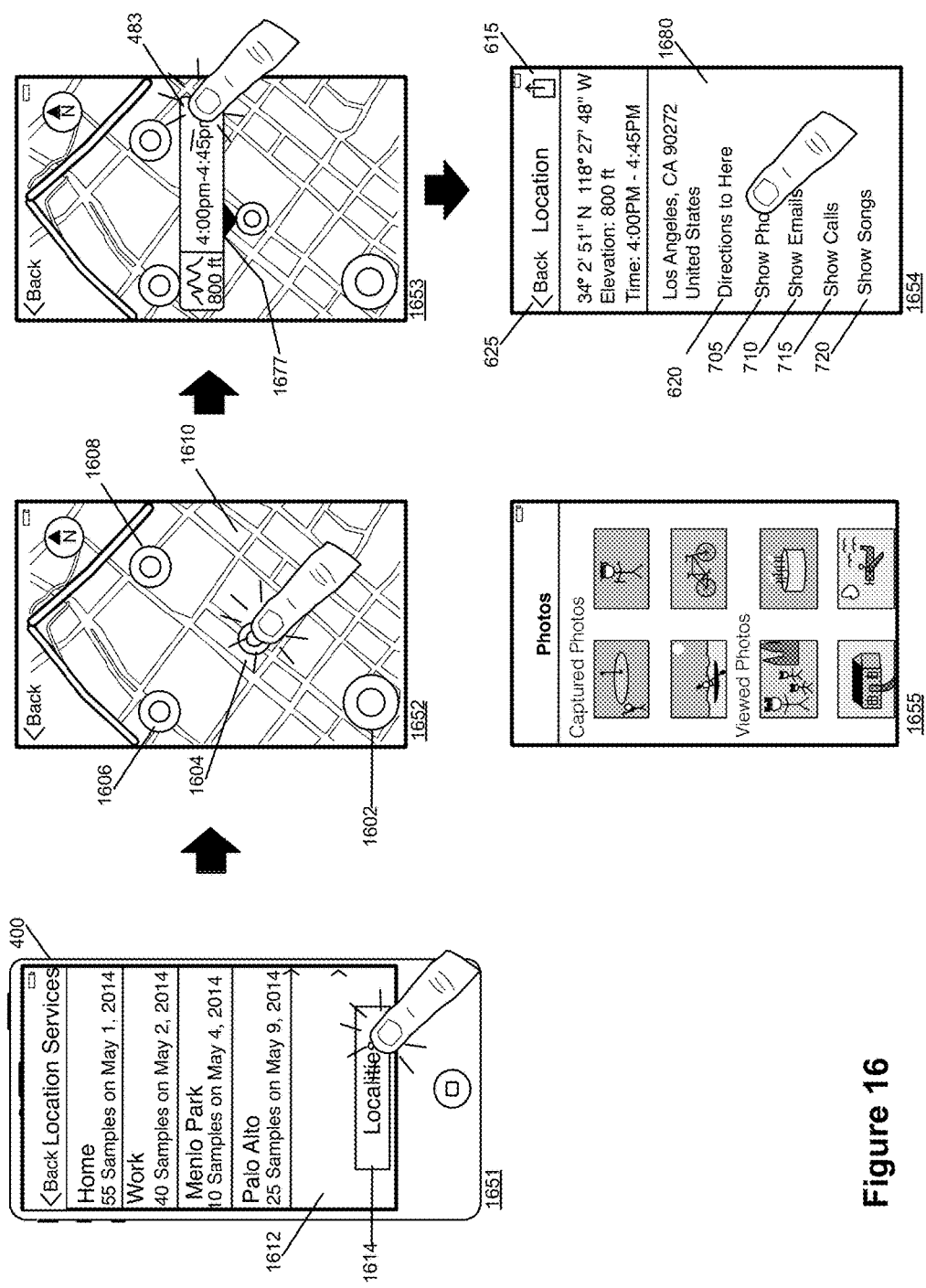
FIG. 16 illustrates an example of some embodiments that present recorded content data for localities without displaying the localities along a traversed route.

Several of the above-described embodiments present recorded data for localities by first displaying the localities on routes traversed by the device. As mentioned above, some embodiments present recorded content data for localities without displaying the localities along traversed routes. FIG. 16 illustrates one such example. Specifically, in five operational UI stages 1651-1655, this figure shows four unconnected localities 1602-1608 on a map 1610, and displays recorded content data for a selected one of these localities 1604. In this example, the localities and their recorded content are accessed through a location service page 1612 of the operating system of the device 400. However, in other embodiments, these unconnected localities and their associated content can be accessed through other features of the operating system or through other applications executing on the device 400.

Each of the localities 1602-1608 is a sub-region at which the device stayed a particular duration of time. The first stage 1651 shows the location service page 1612 of the device 400 of some embodiments. As shown, this page 1612 provides a list of several localities and has a control 1614 for presenting localities on a map. As mentioned above, the localities in some embodiments are sub-regions at which the device stayed a particular duration of time. As such, these localities are temporal localities that are defined based on the device's duration of stay at the localities. When the device travels to a sub-region during different time periods (e.g., on different days), the device creates different temporal localities for the sub-region in some embodiments, because a temporal locality is defined as a locality that is defined in terms of space and time in these embodiments. However, some embodiments bias the creation of temporal localities to only those sub-regions to which the device frequently travels. In other words, these embodiments do not define or more quickly discard temporal localities that correspond to sub-regions that the device travels to once or very infrequently.

The first stage 1651 shows the user's selection of localities control 1614. In response to this selection, the device displays the four unconnected localities 1602-1608 on the map 1610, as shown in the second stage 1652. This stage also shows the user selecting locality 1604. As shown in the third stage 1653, this selection causes the operating system to present a banner 1677 that is similar to the above-described banners 477 and 677.

The third stage 1653 shows the user selecting the control 483 to see more information regarding the selected locality 1604. In response to this selection, the device displays an information page 1680 that displays additional information about the locality 1604, as shown in the fourth stage 1654. This information includes location data, such as longitude, latitude, altitude of the particular location, as well as temporal data, such as the time at which the device was at that particular location. This page also includes controls for viewing (1) images captured by the device at this locality, (2) emails sent and/or reviewed by the device at the locality, (3) phone calls made or received by the device at the locality, and (4) song played by the device at the locality. Examples of other types of data that is recorded and made available in other embodiments include text messages sent and/or reviewed at the locality, and other content (e.g., videos, documents, voicemails, etc.) viewed or listened to at the locality.

The user can scroll up and down (e.g., by swiping up and down) along the info page 1680 to see the displayed information when not all of the information can fit within one page. The page 1680 also includes controls 615, 620, and 625, which are similar to the similarly numbered controls in FIG. 6.

The fourth stage 1654 also shows the user selecting the control 705 for displaying photos that were captured or viewed at the locality. As shown in the fifth stage 1655, this selection causes the operating system to present these photos to the user. Even though FIG. 16 shows the user selecting the photos for viewing, the user could have chosen to view the emails, phone calls and the songs associated with this locality. Also, even though this figure shows the user accessing the info page 1680 through the control 483 of the banner 1677, the user in some embodiments can view the data recorded for a locality by selecting the locality from the list of localities that is presented on the first stage 1651.

Figure 17:
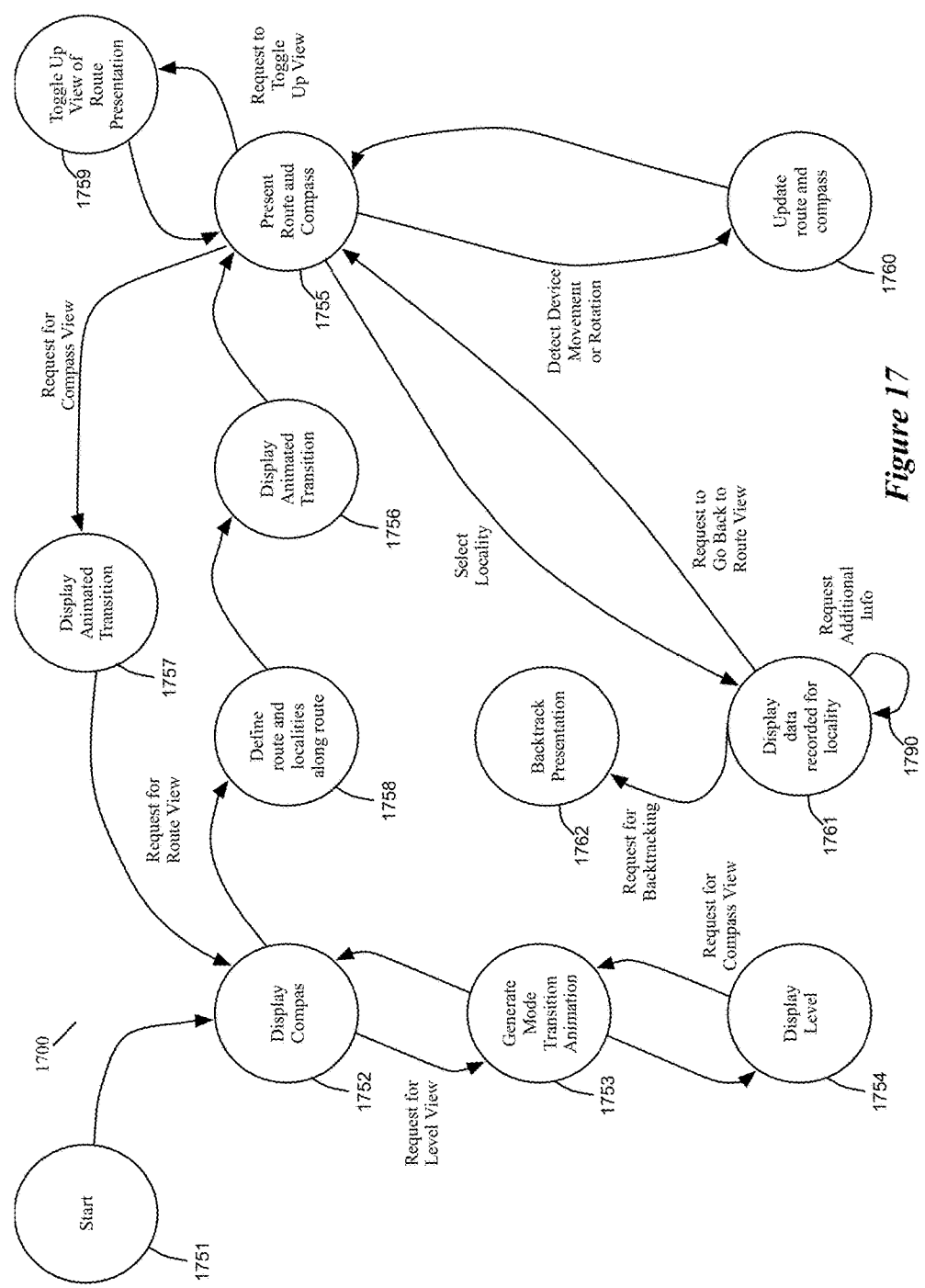
FIG. 17 presents a state diagram that illustrates how the compass application of some embodiments transitions between its various modalities.

FIG. 17 presents a state diagram 1700 that illustrates how the compass application of FIGS. 4-13 transitions between its various modalities. This diagram illustrates twelve states 1751-1762, each of which is implemented by one or more application processes that are responsible for the UI display and operation during these states. In order not to obscure the discussion of this figure with unnecessary detail, some of the states (e.g., the end state) and some of the inter-state transitions (e.g., transitions out of the backtracking presentation state 1762) are not displayed in the state diagram 1700.

As shown, the compass application in some embodiments transitions to the compass display state 1752 from its start state 1751 once the application starts. In the compass display state 1752, the compass application is in its compass mode, which for some embodiments is shown in the first stage 451 of FIG. 4. From the compass mode, the compass application can transition to its level mode or to its route-presentation mode, as described above by reference to FIGS. 4 and 5.

The transition to either of these modes is an animated transition in some embodiments. Specifically, as shown in FIG. 17, transitions between the compass and level mode states 1752 and 1754 go through the transition animation state 1753, which generates an animation that shows the application transitioning from one mode (e.g., the compass mode or the level mode) to another mode (e.g., to the level mode or the compass mode).

Similarly, as shown, transitions between the compass and route-presentation mode states 1752 and 1755 go through transition animation states 1756 or 1757. Transition animation state 1756 generates an animation that shows the application transitioning from the compass mode to route-presentation mode, while the transition animation state 1757 generates an animation that shows the application transitioning from route-presentation mode to the compass mode. Before transitioning to the transition animation state 1756, the application transitions from the compass mode state 1752 to the route-definition state 1758, during which the application generates a definition of a route to be rendered during the transition animation state 1756. One example of the animated transition between the compass and route-presentation modes was described above by reference to FIG. 4.

While in the route-presentation state 1755, the application can switch between north-up and device-orientation up views in some embodiments. FIG. 17 illustrates the changing between these views by showing the application transitioning to state 1759 to switch the presentations between these two views each time the user changes between these views.

From the route-presentation state 1755, the application also transitions to state 1760 to update the route and/or compass display as the device moves or rotates. As mentioned above, the application in some embodiments (1) updates the route based on translational computations, and (2) updates the compass based on sensor output. After updating the route and/or compass, the application returns to state 1755 to display the updated results.

From the route-presentation state 1755, the application also transitions to the info-display state 1761 when a locality is selected on a route. In the info-display state 1761, the application provides information about the selected locality in a banner that it opens near the selected locality, as shown in FIG. 6. Also, as shown in FIG. 6, the application in this state 1761 displays an info-display page when additional information is requested, as pictorially represented by the loop back transition 1790.

As shown in FIG. 17, the application transitions to the backtracking presentation state 1762 from the info-display state when the backtracking affordance 481 is selected in the banner or the backtracking control 620 is selected in the info-display page. As mentioned above by reference to FIG. 8, the application in some embodiments transitions to the backtracking presentation by providing an animation that shows the route presentation rotate from a north-up view to a device-heading view.

Figure 18:
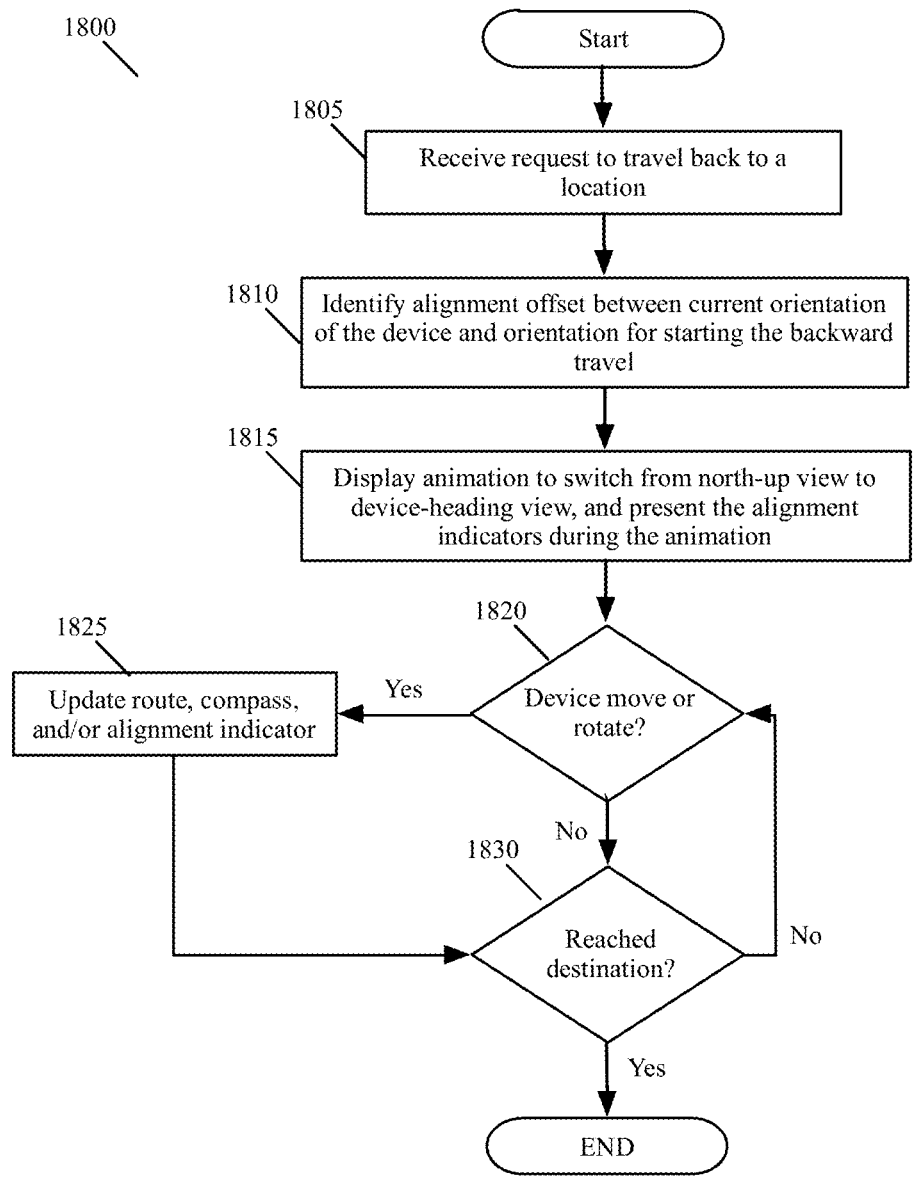
FIG. 18 conceptually illustrates a process that the compass application of some embodiments performs to provide the backtracking presentation.

FIG. 18 conceptually illustrates a process 1800 that the compass application performs to provide the backtracking presentation. As shown, the process starts when it receives (at 1805) a request to travel back to a selected locality. In some embodiments, this request can be made by selecting the backtracking affordance 481 or the backtracking control 620 that are respectively illustrated in FIGS. 4 and 6.

After 1805, the process identifies (at 1810) the angular offset between the current orientation of the device and the orientation needed for starting the backwards travel along a displayed route. Next, at 1815, the process displays an animation to switch the route presentation from a north-up view to a device-heading view. During this animation, the process also displays misalignment indicators 890 based on the angular offset identified at 1810.

At 1820, the process then determines whether the device has moved or rotated. If not, it transitions to 1830, which will be described below. On the other hand, when the device determines (at 1820) that the device has moved or rotated, it (at 1825) updates the route, compass and/or misalignment indicators based on the detected movement or rotation. As the device moves or rotates, the process 1800 in some embodiments removes or adds misalignment indicators to show that the device is improving or worsening its alignment with the previously traveled route. Also, in some embodiments, the process removes portions of the displayed route as the device travels back over them.

From 1825, the process 1800 transitions to 1830, where it determines whether the device has reached the selected locality (i.e., the destination of the backward travel). If so, the process ends. Otherwise, the process returns to 1820 to determine whether the device has rotated or moved such that the route, compass, and/or misalignment indicators have to be updated.

Figure 19:
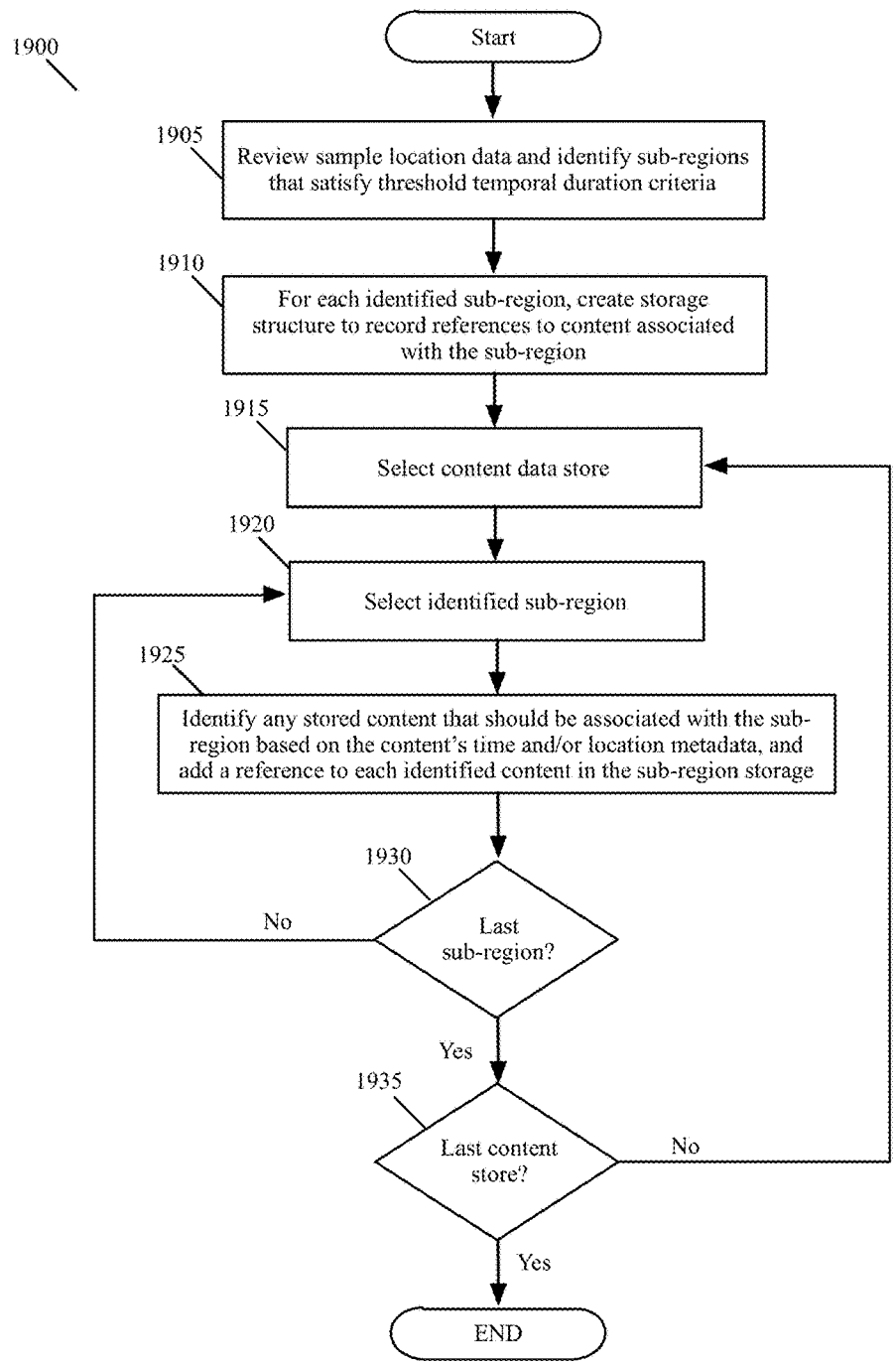
FIG. 19 illustrates a process that the compass application of some embodiments performs to identify temporal localities and to associate non-location data with the identified temporal localities.

FIG. 19 illustrates a process 1900 that the compass application performs in some embodiments to identify temporal localities and to associate non-location data with the identified temporal localities. The process 1900 identifies temporal localities based on the duration that the device stayed at the localities. Given that the device in some embodiments stores content data with metadata that identifies the location and time of the data, the process 1900 examines one or more data stores (1) to identify the content data that is associated with (e.g., was reviewed, sent, played, etc.) the identified localities, and (2) to create associations between the identified localities and content data, so that the associated content data can later be quickly retrieved. The process 1900 will be described by reference to FIG. 20, which presents a locality database 2000 that stores the identities of the localities along with references to their associated content data.

In some embodiments, the compass application periodically performs the process 1900. As shown in FIG. 19, the process 1900 initially (at 1905) retrieves sample location data (e.g., sample location data that the process has not previously analyzed in a previous iteration), and analyzes this data to identify sub-regions that satisfy a temporal duration threshold. The process 1900 designates each identified sub-region as a selectable temporal locality in some embodiments. In some embodiments, the process identifies a sub-region as a temporal locality when it detects that the device captured more than a threshold number of location sample data within a time duration (e.g., within 15 minutes) and within close proximity to each other. The process then defines the sub-region about the proximally captured location samples. U.S. patent application Ser. Nos. 14/081,895, 14/020,689, and 14/022,099 describe methods that identify localities based on duration of the devices stay and/or the number of captured location sample data.

Figure 20:
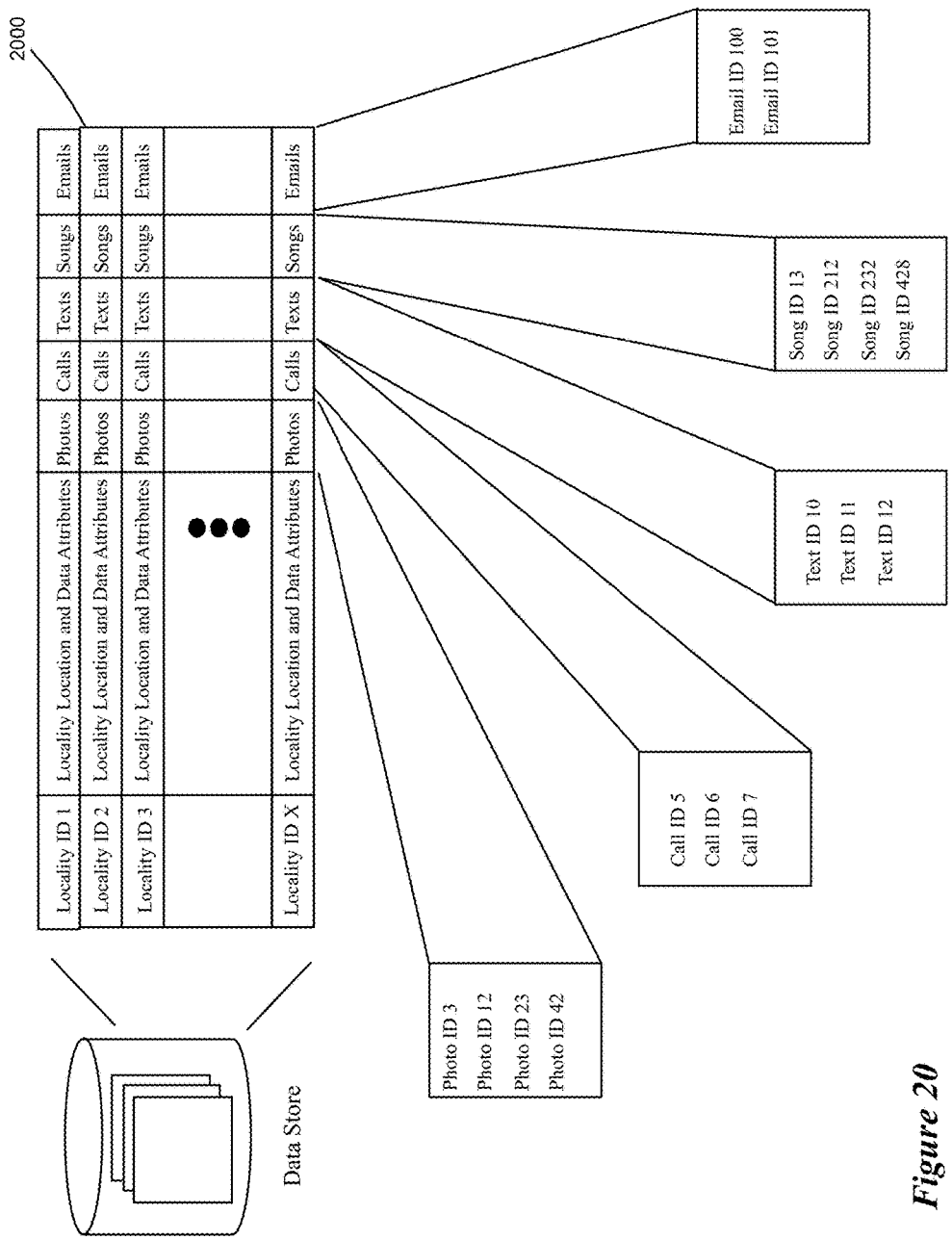
FIG. 20 presents a locality database that stores the identities of the localities along with references to their associated content data.

Next, at 1910, the process creates a storage structure for each identified sub-region. This storage structure is different in different embodiments. For instance, as shown in FIG. 20, this structure is a record in a table in some embodiments. In other embodiments, this structure is a table, a file, or any other storage structure. At 1910, the process creates the storage structure for each identified sub-region in order to store location and time data about the sub-region and references to the associated content data for the sub-region.

After 1910, the process selects (at 1915) a content data store, such as a photo database, a telephone database, a text message database, an email database, a song database, or any other media database. Next, at 1920, the process selects one of the sub-regions identified at 1905. For this selected sub-region, the process then identifies (at 1925) stored content data in the selected data store (i.e., in the data store selected at 1915) that should be associated with the selected sub-region based on the content data's time and/or location metadata. In other words, if the content data's metadata shows that the content data was received, viewed, played, etc. at the selected sub-region, the process (at 1925) identifies the content data and creates an association with this content data and the selected sub-region.

FIG. 19 illustrates how some embodiments create association between the localities and their content data. This figure illustrates several records of several localities (i.e., sub-regions). Each locality's record identifies the locality in terms of a locality ID. Also, each locality's record includes one or more fields that provide location and temporal data (e.g., latitude, longitude, altitude, and time period data) for the locality. Each locality's record also has a set of fields that creates association between the locality and a set of content data types. In the example illustrated in FIG. 19, these set of fields includes a photo field, a call field, a text field, a song field, and an email field. As shown, each of these fields identifies one or more content data identifiers that identify one or more pieces of content in a content data store. The content identifiers of different fields in some embodiments refer to different data stores (e.g., different databases) for different types of content.

In some embodiments, each of these fields can be an array that includes several entries, with each entry being an identifier that identifies in a content data store one piece of content. For instance, the photo field can include an array of photo identifiers, with each photo identifier identifying an image in a photo database. In other embodiments, each field can include a pointer to a list that lists one or more content data identifiers. In still other embodiments, each field includes multiple pointers to multiple pieces of content data. Yet other embodiments use other manners of identifying the content data associated with a locality in the data store of the locality or localities.

After creating association between the identified content data and the selected sub-region, the process determines (at 1930) whether it has examined all of the identified sub-regions. If not, the process returns to 1920 to select another sub-region. Otherwise, the process determines (at 1935) whether it has examined the last content data store. If so, the process ends. If not, the process return to 1915 to select another content data store to examine for content associated with the sub-regions identified at 1905.

One of ordinary skill in the art will realize that the process 1900 is implemented differently in other embodiments. For instance, instead of just identifying the localities at 1905 based on the number of location samples and the duration of the device's stay, the process 1900 in some embodiments also analyzes the amount of non-location data that is stored in various content data storages of the device for a particular locality and time period. In other words, some embodiments only define sub-regions for localities that have a threshold amount of associated non-location data recorded on the device.

While in many of the above exemplary figures a compass application has been used as an application that deploys the above described embodiments, as described earlier (e.g., by reference to FIGS. 1 and 2), some embodiments can be implemented by a device's operating system or one or more applications that run on the device. Additionally, while the invention has been described with reference to numerous specific details, one of ordinary skill in the art will recognize that the invention can be embodied in other specific forms without departing from the spirit of the invention. For instance, a number of the figures (e.g., FIGS. 18 and 19) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Therefore, one of ordinary skill in the art would understand that the invention is not to be limited by the foregoing illustrative details, but rather is to be defined by the appended claims.

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 21:
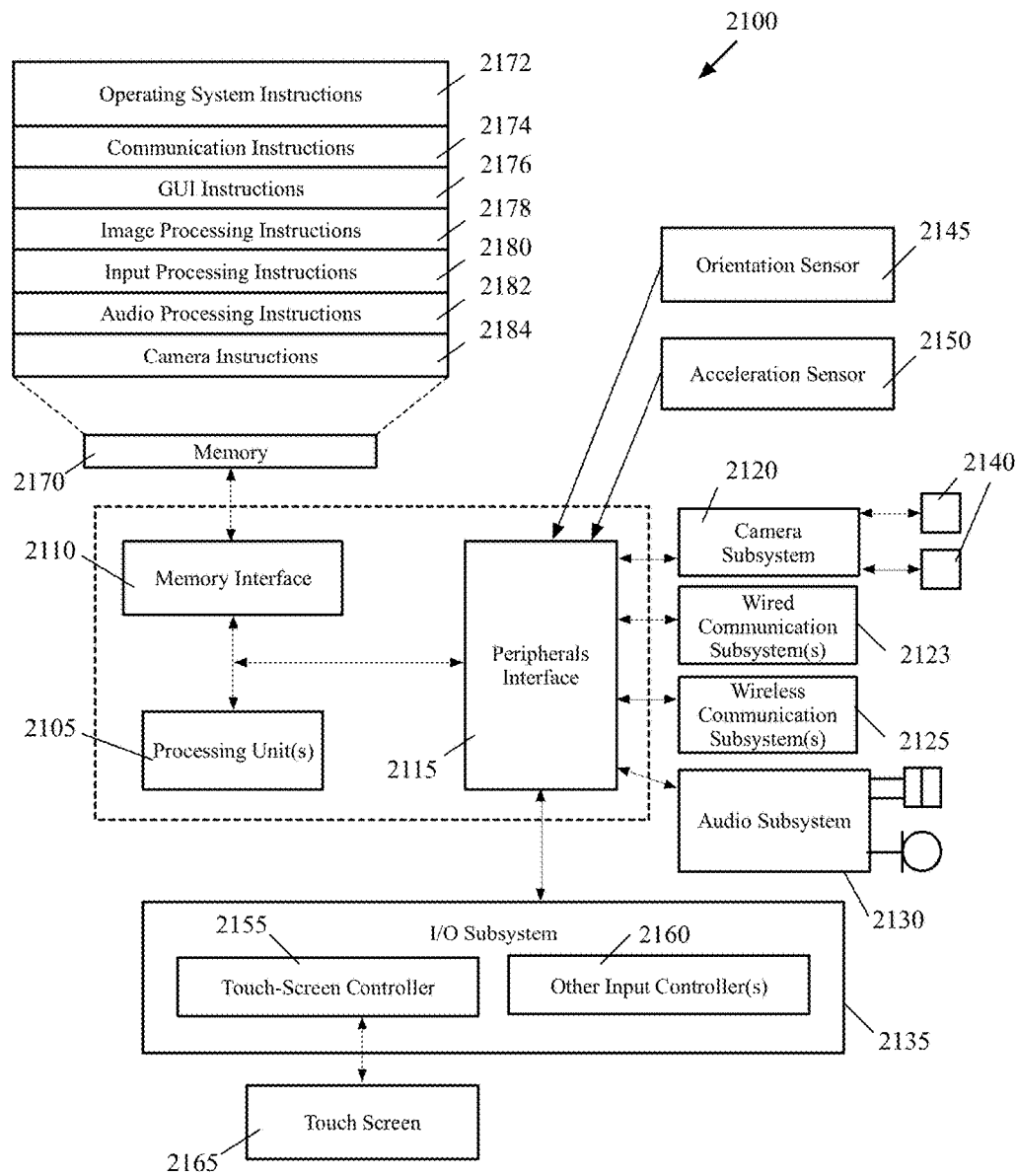
FIG. 21 illustrates an example of an architecture of a mobile computing device.

The applications of some embodiments operate on mobile devices, such as smart phones (e.g., iPhones®) and tablets (e.g., iPads®). FIG. 21 is an example of an architecture of such a mobile computing device 2100. Examples of mobile computing devices include smartphones, tablets, laptops, etc. As shown, the mobile computing device 2100 includes one or more processing units 2105, a memory interface 2110 and a peripherals interface 2115.

The peripherals interface 2115 is coupled to various sensors and subsystems, including a camera subsystem 2120, a wireless communication subsystem(s) 2125, an audio subsystem 2130, an I/O subsystem 2135, etc. The peripherals interface 2115 enables communication between the processing units 2105 and various peripherals. For example, an orientation sensor 2145 (e.g., a gyroscope) and an acceleration sensor 2150 (e.g., an accelerometer) is coupled to the peripherals interface 2115 to facilitate orientation and acceleration functions.

The camera subsystem 2120 is coupled to one or more optical sensors 2140 (e.g., a charged coupled device (CCD) optical sensor, a complementary metal-oxide-semiconductor (CMOS) optical sensor, etc.). The camera subsystem 2120 coupled with the optical sensors 2140 facilitates camera functions, such as image and/or video data capturing. The wireless communication subsystem 2125 serves to facilitate communication functions. In some embodiments, the wireless communication subsystem 2125 includes radio frequency receivers and transmitters, and optical receivers and transmitters (not shown in FIG. 21). These receivers and transmitters of some embodiments are implemented to operate over one or more communication networks such as a GSM network, a Wi-Fi network, a Bluetooth network, etc. The audio subsystem 2130 is coupled to a speaker to output audio (e.g., to output voice navigation instructions). Additionally, the audio subsystem 2130 is coupled to a microphone to facilitate voice-enabled functions, such as voice recognition (e.g., for searching), digital recording, etc.

The I/O subsystem 2135 involves the transfer between input/output peripheral devices, such as a display, a touch screen, etc., and the data bus of the processing units 2105 through the peripherals interface 2115. The I/O subsystem 2135 includes a touch-screen controller 2155 and other input controllers 2160 to facilitate the transfer between input/output peripheral devices and the data bus of the processing units 2105. As shown, the touch-screen controller 2155 is coupled to a touch screen 2165. The touch-screen controller 2155 detects contact and movement on the touch screen 2165 using any of multiple touch sensitivity technologies. The other input controllers 2160 are coupled to other input/control devices, such as one or more buttons. Some embodiments include a near-touch sensitive screen and a corresponding controller that can detect near-touch interactions instead of or in addition to touch interactions.

The memory interface 2110 is coupled to memory 2170. In some embodiments, the memory 2170 includes volatile memory (e.g., high-speed random access memory), non-volatile memory (e.g., flash memory), a combination of volatile and non-volatile memory, and/or any other type of memory. As illustrated in FIG. 21, the memory 2170 stores an operating system (OS) 2172. The OS 2172 includes instructions for handling basic system services and for performing hardware dependent tasks.

The memory 2170 also includes communication instructions 2174 to facilitate communicating with one or more additional devices; graphical user interface instructions 2176 to facilitate graphic user interface processing; image processing instructions 2178 to facilitate image-related processing and functions; input processing instructions 2180 to facilitate input-related (e.g., touch input) processes and functions; audio processing instructions 2182 to facilitate audio-related processes and functions; and camera instructions 2184 to facilitate camera-related processes and functions. The instructions described above are merely exemplary and the memory 2170 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 21 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 21 may be split into two or more integrated circuits.

Figure 22:
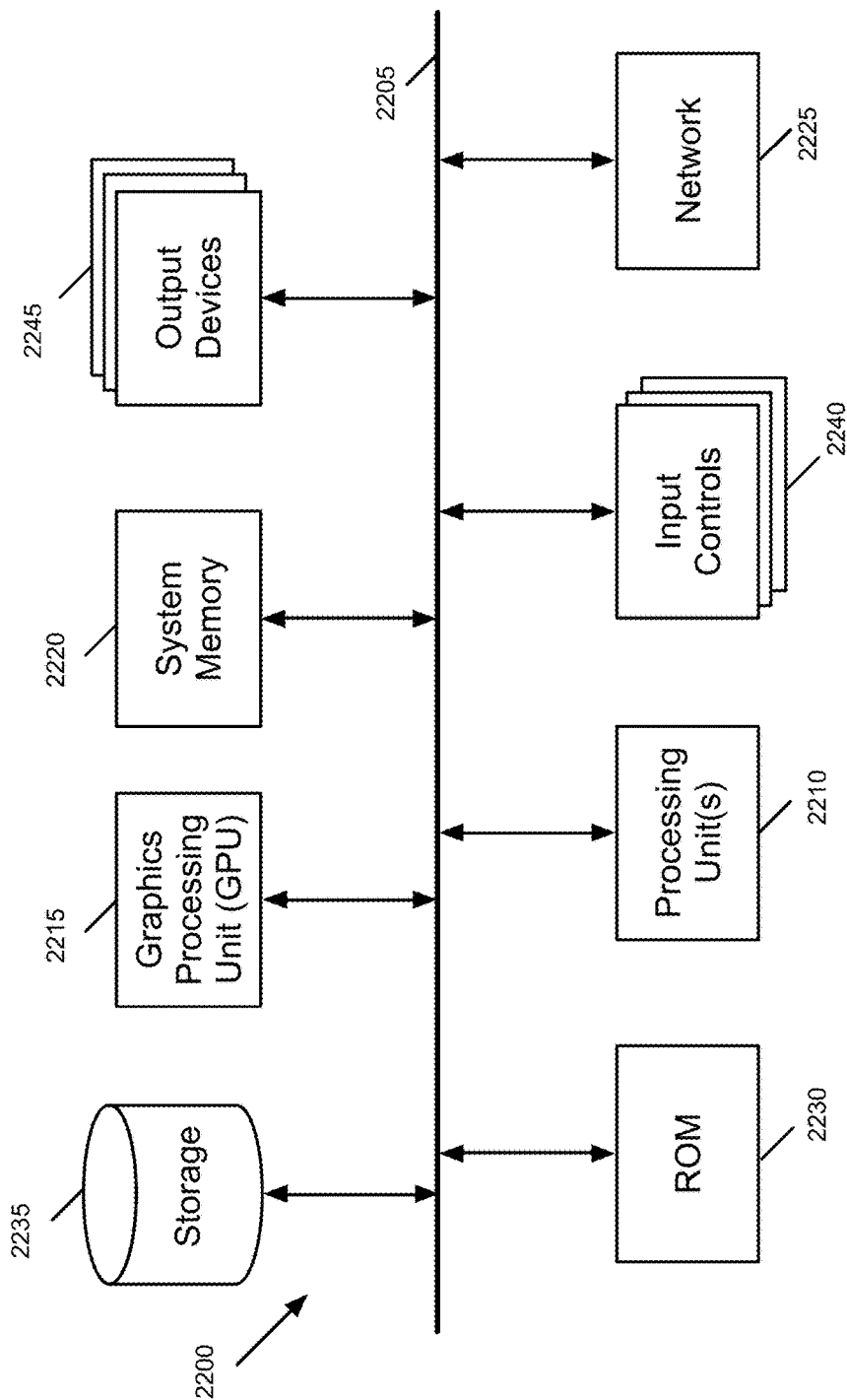
FIG. 22 illustrates an example of an electronic system with which some embodiments of the invention are implemented.

FIG. 22 conceptually illustrates another example of an electronic system 2200 with which some embodiments of the invention are implemented. The electronic system 2200 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 2200 includes a bus 2205, processing unit(s) 2210, a graphics processing unit (GPU) 2215, a system memory 2220, a network 2225, a read-only memory 2230, a permanent storage device 2235, input devices 2240, and output devices 2245.

The bus 2205 collectively represents all system, peripheral, and chipset buses that communicatively connect the numerous internal devices of the electronic system 2200. For instance, the bus 2205 communicatively connects the processing unit(s) 2210 with the read-only memory 2230, the GPU 2215, the system memory 2220, and the permanent storage device 2235.

From these various memory units, the processing unit(s) 2210 retrieves instructions to execute and data to process in order to execute the processes of the invention. The processing unit(s) may be a single processor or a multi-core processor in different embodiments. Some instructions are passed to and executed by the GPU 2215. The GPU 2215 can offload various computations or complement the image processing provided by the processing unit(s) 2210. In some embodiments, such functionality can be provided using CoreImage's kernel shading language.

The read-only-memory (ROM) 2230 stores static data and instructions that are needed by the processing unit(s) 2210 and other modules of the electronic system. The permanent storage device 2235, on the other hand, is a read-and-write memory device. This device is a non-volatile memory unit that stores instructions and data even when the electronic system 2200 is off. Some embodiments of the invention use a mass-storage device (such as a magnetic or optical disk and its corresponding disk drive, integrated flash memory) as the permanent storage device 2235.

Other embodiments use a removable storage device (such as a floppy disk, flash memory device, etc., and its corresponding drive) as the permanent storage device. Like the permanent storage device 2235, the system memory 2220 is a read-and-write memory device. However, unlike storage device 2235, the system memory 2220 is a volatile read-and-write memory, such a random access memory. The system memory 2220 stores some of the instructions and data that the processor needs at runtime. In some embodiments, the invention's processes are stored in the system memory 2220, the permanent storage device 2235, and/or the read-only memory 2230. For example, the various memory units include instructions for processing multimedia clips in accordance with some embodiments. From these various memory units, the processing unit(s) 2210 retrieves instructions to execute and data to process in order to execute the processes of some embodiments.

The bus 2205 also connects to the input and output devices 2240 and 2245. The input devices 2240 enable the user to communicate information and select commands to the electronic system. The input devices 2240 include alphanumeric keyboards and pointing devices (also called "cursor control devices"), cameras (e.g., webcams), microphones or similar devices for receiving voice commands, etc. The output devices 2245 display images generated by the electronic system or otherwise output data. The output devices 2245 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 22, bus 2205 also couples electronic system 2200 to a network 2225 through a network adapter (not shown). In this manner, the computer can be a part of a network of computers (such as a local area network ("LAN"), a wide area network ("WAN"), or an Intranet), or a network of networks, such as the Internet. Any or all components of electronic system 2200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

Figure 23:
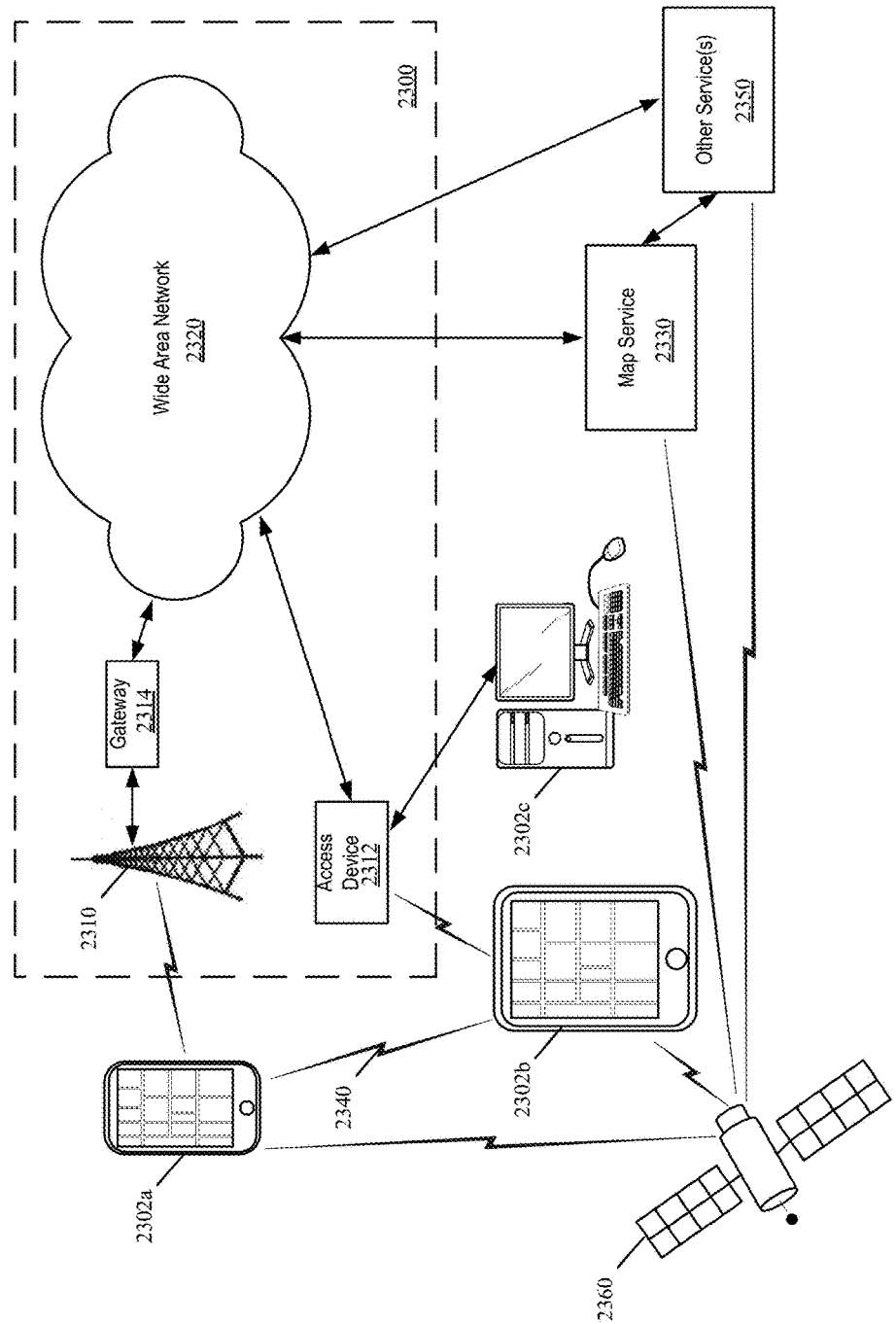
FIG. 23 illustrates a map service operating environment, according to some embodiments.

Various embodiments may operate within a map service operating environment. FIG. 23 illustrates one possible embodiment of an operating environment 2300 for a map service (also referred to as a mapping service) 2330 and client devices 2302a-2302c. In some embodiments, devices 2302a, 2302b, and 2302c communicate over one or more wired or wireless networks 2310. For example, wireless network 2310, such as a cellular network, can communicate with a wide area network (WAN) 2320, such as the Internet, by use of gateway 2314. A gateway 2314 in some embodiments provides a packet oriented mobile data service, such as General Packet Radio Service (GPRS), or other mobile data service allowing wireless networks to transmit data to other networks, such as wide area network 2320. Likewise, access device 2312 (e.g., IEEE 802.11g wireless access device) provides communication access to WAN 2320.

The client devices 2302a and 2302b can be any portable electronic or computing device capable of communicating with a map service (e.g., smart phone, tablet, laptop computer, etc.). Device 2302c can be any non-portable electronic or computing device capable of communicating with a map service (e.g., desktop computer, etc.). These devices may be multifunction devices capable of various functions (e.g., placing phone calls, sending electronic messages, producing documents, etc.). Though the devices 2302a-2302c are not shown as each accessing the map service 2330 via either the wireless network 2310 and gateway 2314 or the access device 2312, one of ordinary skill in the art will recognize that the client devices of some embodiments may access the map service via multiple different wired and/or wireless protocols.

Devices 2302a-2302c can also establish communications by other means. For example, these devices may communicate with other wireless devices (e.g., other devices 2302b, cell phones, etc.) over the wireless network 2310 or through access device 2312. Likewise the devices 2302a-2302c can establish peer-to-peer communications 2340 (e.g., a personal area network) by use of one or more communication subsystems, such as Bluetooth® communication or similar peer-to-peer protocols.

Devices 2302a-2302c may also receive Global Positioning Satellite (GPS) signals from GPS satellites 2360. In addition, in some embodiments the map service 2330 and other services 2350 may also receive GPS signals from GPS satellites 2360.

A map service 2330 may provide map services for one or more client devices 2302a-2302c in communication with the map service 2330 through various communication methods and protocols. A map service 2330 in some embodiments provides map information (e.g., map tiles used by the client devices to generate a two-dimensional or three-dimensional map presentation) and other map-related data, such as two-dimensional map image data (e.g., aerial view of roads utilizing satellite imagery), three-dimensional map image data (e.g., traversable map with three-dimensional features, such as buildings), route and direction calculations (e.g., driving route data, ferry route calculations, directions between two points for a pedestrian, etc.), real-time navigation data (e.g., turn-by-turn visual navigation data in two or three dimensions), traffic data, location data (e.g., where the client device currently is located), and other geographic data (e.g., wireless network coverage, weather, traffic information, or nearby points-of-interest). In various embodiments, the map service data may include localized labels for different countries or regions. Localized labels may be utilized to present map labels (e.g., street names, city names, points of interest) in different languages on client devices. The client devices 2302a-2302c may utilize these map services to obtain the various map service data, then implement various techniques to process the data and provide the processed data to various entities (e.g., internal software or hardware modules, display screens of the client devices, external display screens, or other external systems or devices.

The map service 2330 of some embodiments provides map services by generating and distributing the various types of map service data listed above, including map information used by the client device to generate and display a map presentation. In some embodiments, the map information includes one or more map tiles. The map tiles may include raster image data (e.g., bmp, gif, jpg/jpeg/, png, tiff, etc. data) for display as a map presentation. In some embodiments, the map tiles provide vector-based map data, with the map presentation data encoded using vector graphics (e.g., svg or drw data). The map tiles may also include various other information pertaining to the map, such as metadata. Some embodiments also encode style data (e.g., used to generate textures) into the map tiles. The client device processes (e.g., renders) the vector and/or raster image data to generate a map presentation for display as a two-dimensional or three-dimensional map presentation. To transmit the map tiles to a client device 2302a-2302c, the map service 2330 of some embodiments, performs various optimization techniques to analyze a map tile before encoding the tile.

In some embodiments, the map tiles are generated by the map service 2330 for different possible display resolutions at the client devices 2302a-2302c. In some embodiments, the higher zoom levels may include more detail (e.g., more street level information, etc.). On the other hand, map tiles for lower zoom levels may omit certain data (e.g., the street level details would not be used when displaying the entire earth).

To generate the map information (e.g., map tiles), the map service 2330 may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

In some embodiments, the map service 2330 responds to requests from the client devices 2302a-2302c for map information. The client devices may request specific portions of a map, or specific map tiles (e.g., specific tiles at specific zoom levels). In some embodiments, the client devices may provide the map service with starting locations (or current locations) and destination locations for a route calculations, and request turn-by-turn navigation data. A client device may also request map service rendering information, such as map textures or style sheets. Requests for other geographic data may include, but are not limited to, current location, wireless network coverage, weather, traffic information, or nearby points-of-interest.

The client devices 2302a-2302c that obtain map service data from the map service 2330 and render the data to display the map information in two-dimensional and/or three-dimensional views. Some embodiments display a rendered map and allow a user, system, or device to provide input to manipulate a virtual camera for the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. Other input devices to the client device may be used including, e.g., auditory input (e.g., spoken words), a physical keyboard, mouse, and/or a joystick. Some embodiments provide various visual feedback to virtual camera manipulations, such as displaying an animation of possible virtual camera manipulations when transitioning from two-dimensional map views to three-dimensional map views.

In some embodiments, a client device 2302a-2302c implements a navigation system (e.g., turn-by-turn navigation), which may be part of an integrated mapping and navigation application. A navigation system provides directions or route information, which may be displayed to a user. As mentioned above, a client device may receive both map image data and route data from the map service 2330. In some embodiments, the navigation feature of the client device provides real-time route and direction information based upon location information and route information received from a map service and/or other location system, such as a Global Positioning Satellite (GPS) system. A client device may display map image data that reflects the current location of the client device and update the map image data in real-time. The navigation features may provide auditory or visual directions to follow a certain route, and some embodiments display map data from the perspective of a virtual camera biased toward the route destination during turn-by-turn navigation.

The client devices 2302a-2302c of some embodiments implement various techniques to utilize the received map service data (e.g., optimized rendering techniques). In some embodiments, a client device locally stores some of the information used to render map data. For instance, client devices may store style sheets with rendering directions for image data containing style identifiers, common image textures (in order to decrease the amount of map image data transferred from the map service), etc. The client devices of some embodiments may implement various techniques to render two-dimensional and three-dimensional map image data, including, e.g., generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data.

In various embodiments, map service 2330 and/or other service(s) 2350 are configured to process search requests from any of the client devices. Search requests may include but are not limited to queries for businesses, addresses, residential locations, points of interest, or some combination thereof. Map service 2330 and/or other service(s) 2350 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria including but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 2330 and/or other service(s) 2350 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 2330 and/or other service(s) 2350, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 2330 and/or other service(s) 2350 provide one or more feedback mechanisms to receive feedback from client devices 2302a-2302c. For instance, client devices may provide feedback on search results to map service 2330 and/or other service(s) 2350 (e.g., feedback specifying ratings, reviews, temporary or permanent business closures, errors etc.); this feedback may be used to update information about points of interest in order to provide more accurate or more up-to-date search results in the future. In some embodiments, map service 2330 and/or other service(s) 2350 may provide testing information to the client device (e.g., an A/B test) to determine which search results are best. For instance, at random intervals, the client device may receive and present two search results to a user and allow the user to indicate the best result. The client device may report the test results to map service 2330 and/or other service(s) 2350 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. One of ordinary skill in the art would understand that the invention is not to be limited by the foregoing illustrative details, but rather is to be defined by the appended claims.

What is claimed is:

1. A method of representing a device's traversal along a route, the method comprising:
   at a device:
      capturing and storing, at the device, location data at a plurality of locations traversed along the route, the plurality of traversed locations including a first region and a second region;
      determining, by the device, whether the location data corresponding to the first region and the second region indicates that the device was in a respective region for a time period that exceeds a threshold time period;

upon receiving a request to view the traversed locations along the route:

in accordance with a determination that the location data corresponding to the first region indicates that the device was in the first region for a time period that exceeds the threshold time period, displaying, under control of the device, a route representation including a first representation of the first region traversed along the route, and in accordance with a determination that the location data corresponding to the second region indicates that the device was in the second region for a time period that does not exceed the threshold time period, foregoing display of, under control of the device, a second representation of the second region traversed along the route; and upon receiving an identification of the first representation of the first region in the displayed route representation, displaying, under control of the device, information regarding the first region.

2. The method of claim 1, wherein displaying the route representation comprises displaying region indicators that identify regions along the route that include more than a threshold amount of captured location data.

3. The method of claim 2, wherein more than a threshold amount of location data are captured in each of said regions because the device was in the first region for a time period that is larger than the threshold time period.

4. The method of claim 2, wherein the device comprises at least one location identifying module, wherein capturing the location data comprises obtaining location samples from the location identifying module.

5. The method of claim 2 further comprising providing a banner for each region for which the route representation includes a region indicator, to present information about the region.

6. The method of claim 5, wherein the information about the region comprises at least a time period during which the device was in the region.

7. The method of claim 5, wherein the information about the region comprises at least geographic information about the region.

8. The method of claim 5, wherein each banner comprises a control for initiating a navigation back to the region associated with the banner.

9. The method of claim 2 further comprising providing at least one selectable control for navigating back to one of the regions for which the route representation includes a region indicator.

10. The method of claim 9, wherein upon selection of the control a set of navigation guide-direction indicators is displayed to assist with the navigation.

11. The method of claim 1 further comprising identifying a subset of the traversed locations by using one or more of location services of the device.

12. The method of claim 11, wherein the location services comprise at least one of a global positioning system (GPS) service, a WiFi location service, and a cellular location service.

13. The method of claim 1 further comprising deriving a subset of the traversed locations based on computations that use data from one or more motion sensors of the device.

14. The method of claim 13, wherein the motion sensors comprise at least an accelerometer of the device.

15. The method of claim 13, wherein the subset of traversed locations is derived by the computations to improve the device's power consumption.

16. The method of claim 1, wherein the representation of the subset of locations along the routes is displayed over one of a plurality of different backdrops.

17. The method of claim 16, wherein the plurality of backdrops comprises at least one of a single-color backdrop, a roadway map of a region traversed by the device, and a topological map of a region traversed by the device.

18. A non-transitory machine readable medium storing one or more programs that capture data regarding a device's traversal along a route, the one or more programs comprising sets of instructions for:

at the device:

capturing and storing, at the device, location data at a plurality of locations traversed along the route, the plurality of traversed locations including a first region and a second region;

determining, by the device, whether the location data corresponding to the first region and the second region indicates that the device was in a respective region for a time period that exceeds a threshold time period;

upon receiving a request to view the traversed locations along the route:

in accordance with a determination that the location data corresponding to the first region indicates that the device was in the first region for a time period that exceeds the threshold time period, displaying, under control of the device, a route representation including a first representation of the first region traversed along the route, and in accordance with a determination that the location data corresponding to the second region indicates that the device was in the second region for a time period that does not exceed the threshold time period, foregoing display of, under control of the device, a second representation of the second region traversed along the route; and upon receiving an identification of the first representation of the first region in the displayed route representation, displaying, under control of the device, information regarding the first region.

19. The machine readable medium of claim 18, wherein the set of instructions for displaying the route representation comprises a set of instructions for displaying region indicators that identify regions along the route that include more than a threshold amount of captured location data.

20. The machine readable medium of claim 18, wherein the one or more programs further comprise a set of instructions for providing a banner for each region for which the route representation includes a region indicator, to present information about the region.

21. The machine readable medium of claim 20, wherein the information about the region comprises: a time period during which the device was in the region.

22. The machine readable medium of claim 20, wherein each banner comprises a control for initiating a navigation back to the region associated with the banner.

23. The machine readable medium of claim 19, wherein more than a threshold amount of location data are captured in each of said regions because the device was in the first region for a time period that is larger than the threshold time period.

24. The machine readable medium of claim 19, wherein the device comprises at least one location identifying module, and wherein the set of instructions for capturing the location data comprises a set of instructions for obtaining location samples from the location identifying module.

25. The machine readable medium of claim 20, wherein the information about the region comprises at least geographic information about the region.

26. The machine readable medium of claim 19, wherein the one or more programs further comprise a set of instructions for providing at least one selectable control for navigating back to one of the regions for which the route representation includes a region indicator.

27. The machine readable medium of claim 26, wherein the set of instructions for providing at least one selectable control include instructions for, upon selection of the control, displaying a set of navigation guide-direction indicators to assist with the navigation.

28. The machine readable medium of claim 18, wherein the one or more programs further comprise a set of instructions for identifying a subset of the traversed locations by using one or more location services of the device.

29. The machine readable medium of claim 28, wherein the location services comprise at least one of a global positioning system (GPS) service, a WiFi location service, and a cellular location service.

30. The machine readable medium of claim 18, wherein the one or more programs further comprise a set of instructions for deriving a subset of the traversed locations based on computations that use data from one or more motion sensors of the device.

31. The machine readable medium of claim 30, wherein the motion sensors comprise at least an accelerometer of the device.

32. The machine readable medium of claim 30, wherein the subset of traversed locations is derived by the computations to improve the device's power consumption.

33. The machine readable medium of claim 18, wherein the representation of the subset of locations along the routes is displayed over one of a plurality of different backdrops.

34. The machine readable medium of claim 33, wherein the plurality of backdrops comprises at least one of a single-color backdrop, a roadway map of a region traversed by the device, and a topological map of a region traversed by the device.

35. A device, comprising:
one or more processors; and
memory storing one or more programs that capture data regarding the device's traversal along a route, the one or more programs comprising sets of instructions for:
at the device:
capturing and storing, at the device, location data at a plurality of locations traversed along the route, the plurality of traversed locations including a first region and a second region;
determining, by the device, whether the location data corresponding to the first region and the second region indicates that the device was in a respective region for a time period that exceeds a threshold time period;
upon receiving a request to view the traversed locations along the route:
in accordance with a determination that the location data corresponding to the first region indicates that the device was in the first region for a time period that exceeds the threshold time period, displaying, under control of the device, a route representation including a first representation of the first region traversed along the route, and
in accordance with a determination that the location data corresponding to the second region indicates that the device was in the second region for a time period that does not exceed the threshold time period, foregoing display of, under control of the device, a second representation of the second region traversed along the route; and
upon receiving an identification of the first representation of the first region in the displayed route representation, displaying, under control of the device, information regarding the first region.

36. The device of claim 35, wherein the set of instructions for displaying the route representation comprises a set of instructions for displaying region indicators that identify regions along the route that include more than a threshold amount of captured location data.

37. The device of claim 36, wherein more than a threshold amount of location data are captured in each of said regions because the device was in the first region for a time period that is larger than the threshold time period.

38. The device of claim 36, wherein the device comprises at least one location identifying module, and the set of instructions for capturing the location data comprises a set of instructions for obtaining location samples from the location identifying module.

39. The device of claim 36 wherein the one or more programs further comprise a set of instructions for providing a banner for each region for which the route representation includes a region indicator, to present information about the region.

40. The device of claim 39, wherein the information about the region comprises at least a time period during which the device was in the region.

41. The device of claim 39, wherein the information about the region comprises at least geographic information about the region.

42. The device of claim 39, wherein each banner comprises a control for initiating a navigation back to the region associated with the banner.

43. The device of claim 36 wherein the one or more programs further comprise a set of instructions for providing at least one selectable control for navigating back to one of the regions for which the route representation includes a region indicator.

44. The device of claim 43, wherein the set of instructions for providing at least one selectable control include instructions for, upon selection of the control, displaying a set of navigation guide-direction indicators to assist with the navigation.

45. The device of claim 35 wherein the one or more programs further comprise a set of instructions for identifying a subset of the traversed locations by using one or more of location services of the electronic device.

46. The device of claim 45, wherein the location services comprise at least one of a global positioning system (GPS) service, a WiFi location service, and a cellular location service.

47. The device of claim 35 wherein the one or more programs further comprise a set of instructions for deriving a subset of the traversed locations based on computations that use data from one or more motion sensors of the electronic device.

48. The device of claim 47, wherein the motion sensors comprise at least an accelerometer of the electronic device.

49. The device of claim 47, wherein the subset of traversed locations is derived by the computations to improve the device's power consumption.

50. The device of claim 35, wherein the representation of the subset of locations along the routes is displayed over one of a plurality of different backdrops.

51. The device of claim 50, wherein the plurality of backdrops comprises at least one of a single-color backdrop, a roadway map of a region traversed by the device, and a topological map of a region traversed by the electronic device.

\* \* \* \* \*